US010967951B2

(12) United States Patent
Mahmulyin

(10) Patent No.: US 10,967,951 B2
(45) Date of Patent: Apr. 6, 2021

(54) HORIZONTAL TAIL LOAD OPTIMIZATION SYSTEM AND METHOD

(71) Applicant: The Boeing Company, Chicago, IL (US)

(72) Inventor: Vedad Mahmulyin, Seattle, WA (US)

(73) Assignee: The Boeing Company, Chicago, IL (US)

( * ) Notice: Subject to any disclaimer, the term of this patent is extended or adjusted under 35 U.S.C. 154(b) by 632 days.

(21) Appl. No.: 15/797,576

(22) Filed: Oct. 30, 2017

(65) Prior Publication Data
US 2018/0043992 A1 Feb. 15, 2018

Related U.S. Application Data

(62) Division of application No. 14/278,868, filed on May 15, 2014, now Pat. No. 9,878,776.

(51) Int. Cl.
| B64C 13/00 | (2006.01) |
| B64C 13/50 | (2006.01) |
| B64C 13/04 | (2006.01) |
| B64C 13/16 | (2006.01) |
| G05D 1/00 | (2006.01) |
| B64C 5/02 | (2006.01) |
| B64C 9/00 | (2006.01) |
| B64D 43/02 | (2006.01) |

(52) U.S. Cl.
CPC ............... *B64C 13/00* (2013.01); *B64C 5/02* (2013.01); *B64C 9/00* (2013.01); *B64C 13/042* (2018.01); *B64C 13/16* (2013.01); *B64C 13/505* (2018.01); *B64C 13/506* (2018.01); *B64D 43/02* (2013.01); *G05D 1/0066* (2013.01)

(58) Field of Classification Search
CPC ......... B64C 13/00; B64C 13/16; B64C 13/24; B64C 13/505; B64C 13/506; B64C 5/02; B64C 9/00; B64D 43/02
See application file for complete search history.

(56) References Cited

U.S. PATENT DOCUMENTS

| 4,744,532 A | 5/1988 | Ziegler |
| 4,825,375 A | 4/1989 | Nadkarni |
| 6,064,923 A | 5/2000 | Bilange |

(Continued)

FOREIGN PATENT DOCUMENTS

| EP | 2368793 | 9/2011 |
| GB | 1010042 | 11/1965 |

(Continued)

OTHER PUBLICATIONS

CIPO, Canadian Office Action for Application No. 2882183, dated Jan. 27, 2017.
CIPO, Canadian Office Action for Application No. 2882183, dated Mar. 29, 2016.

(Continued)

*Primary Examiner* — Benjamin P Lee

(57) ABSTRACT

A method of controlling an elevator of an aircraft includes selecting a factor for increasing or decreasing a predetermined horizontal tail load alleviation (HTLA) authority limit for an elevator based on at least one aircraft parameter. The HTLA authority limit decreases with an increase in Mach number and/or airspeed. The method also includes computing an elevator position limit as a product of the HTLA authority limit and the factor, and moving the elevator to a commanded elevator position that is no greater than the elevator position limit.

31 Claims, 13 Drawing Sheets

(56) References Cited

U.S. PATENT DOCUMENTS

| | | | |
|---|---|---|---|
| 8,024,079 B2 | 9/2011 | Najmabadi et al. | |
| 8,342,445 B2 * | 1/2013 | Tran | B64C 13/26 |
| | | | 244/87 |
| 8,511,620 B2 | 8/2013 | Matsuda | |
| 2005/0021826 A1 | 1/2005 | Kumar | |
| 2007/0114327 A1 * | 5/2007 | Dees | B64C 9/323 |
| | | | 244/34 R |
| 2008/0188999 A1 | 8/2008 | Mathieu | |
| 2009/0292405 A1 | 11/2009 | Najmabadi | |
| 2010/0078518 A1 | 4/2010 | Tran | |
| 2014/0067168 A1 * | 3/2014 | Tran | B64C 13/16 |
| | | | 701/3 |

FOREIGN PATENT DOCUMENTS

| | | |
|---|---|---|
| JP | 2004123010 | 4/2004 |
| JP | 2011057178 | 3/2011 |
| WO | WO2012/168086 | 12/2012 |

OTHER PUBLICATIONS

EPO, European Search Report, Appl. No. 15162586.0-1802, dated Jul. 22, 2015.
Wikipedia, "Lookup Table," retrieved Oct. 30, 2017.
Chinese Patent Office, Chinese Office Action for Application No. 2015101696787, dated Dec. 27, 2018.
Chinese Patent Office, Chinese Office Action for Application No. 2015101696787, dated Apr. 27, 2018.
Chinese Patent Office, Chinese Office Action for Application No. 2015101696787, dated Jan. 21, 2020.
Chinese Patent Office, Chinese Office Action for Application No. 2015101696787, dated Jul. 1, 2019.
Japanese Patent Office, Japanese Office Action for Application No. 2015-097896 dated Apr. 16, 2019.
Australian Patent Office, Australian Office Action for Application No. 2015200726, dated Mar. 19, 2018.
Australian Patent Office, Australian Office Action for Application No. 2018214162 dated Aug. 15, 2019.

* cited by examiner

HORIZONTAL TAIL LOAD OPTIMIZATION SYSTEM AND METHOD

The present application is a divisional of and claims priority to pending application Ser. No. 14/278,868, filed May 15, 2014, entitled SYSTEM AND METHOD FOR OPTIMIZING HORIZONTAL TAIL LOADS, the entire contents of which is incorporated herein by reference.

FIELD

The present disclosure relates generally to flight controls and, more particularly, to systems and methods of optimizing tail loads on an aircraft.

BACKGROUND

Pitch control of an aircraft is the control of the nose-up and nose-down pitch attitude of the aircraft during flight. During changes in pitch attitude, the aircraft pivots about a lateral axis extending through a center of gravity (CG) of the aircraft. Pitch control may be provided by a horizontal tail that may be located aft of the aircraft wings. The horizontal tail may include an adjustable horizontal stabilizer and an elevator. The elevator may be pivotably coupled to the horizontal stabilizer. The angle of incidence of the horizontal stabilizer may be adjusted in a positive and/or negative direction relative to a longitudinal axis of the aircraft to trim the aircraft so that the aircraft is maintained at a constant pitch angle during flight. For example, the horizontal stabilizer may be adjusted at a negative angle of incidence to provide a download so that a nose-up pitching moment is generated about the aircraft CG to counteract a nose-down pitching moment generated by the positive lift of the wings. The load generated by the horizontal tail may be carried by the structure of the horizontal tail and the fuselage.

For nose-up and nose-down pitch maneuvering of the aircraft during flight, the elevator may be pivotably moved upwardly or downwardly from a neutral position relative to the horizontal stabilizer. For example, to maneuver the aircraft from a nose-up attitude to a level attitude, the elevator may be pivotably deflected or positioned downwardly (e.g., elevator trailing edge down) so that the horizontal tail generates an increased amount of upload to bring the nose of the aircraft down. The elevator may be held in the downward position until a level attitude of the aircraft is achieved, after which the elevator may be returned to the neutral position. To maneuver the aircraft from a nose-down attitude to a level attitude, the elevator may be pivotably deflected or positioned upwardly (e.g., elevator trailing edge up) so that the horizontal tail generates an increased amount of download to bring the nose of the aircraft up until a level attitude of the aircraft is achieved.

As the speed of an aircraft increases, dynamic pressure on the horizontal stabilizer and elevator also increases which results in an increase in the upload or download generated by the horizontal tail. To avoid exceeding the load-carrying capability of the horizontal tail and fuselage during nose-up or nose-down maneuvering, the movement or authority of the elevator may be electronically limited as speed increases. Limiting the elevator authority may also provide a more linear or uniform pitch response from pilot input as a function of airspeed. In addition, limiting the elevator authority may prevent excessive maneuvering capability at relatively high dynamic pressure. Unfortunately, excessively limiting the elevator authority as a function of airspeed to reduce tail loads may result in sub-optimal maneuvering capability.

As can be seen, there exists a need in the art for a system and method for moving the elevator within limits that reduce tail loads while providing sufficient authority for pitch control of the aircraft.

SUMMARY

The above-noted needs associated with elevator control are specifically addressed by the present disclosure which provides a method of controlling an elevator of an aircraft. The method may include identifying a current stabilizer angle of incidence of a stabilizer of the aircraft. The stabilizer may include an elevator pivotably coupled to the stabilizer. The method may further include comparing the current stabilizer angle of incidence with a threshold stabilizer angle of incidence, and selecting an elevator position limit that is more restrictive if the current stabilizer angle of incidence is greater than or equal to the threshold stabilizer angle of incidence. The method may additionally include moving the elevator to a commanded elevator position that is no greater than the elevator position limit.

Also disclosed is a system for controlling an elevator of an aircraft. The system may include a flight control processor configured to receive a stabilizer signal representative of a current stabilizer angle of incidence of a stabilizer. As indicated above, the stabilizer may include an elevator that may be pivotably coupled to the stabilizer. The flight control processor may be configured to select an elevator position limit based on the stabilizer signal. The selected elevator position limit may be more restrictive if the current stabilizer angle of incidence is equal to or above a threshold stabilizer angle of incidence, and less restrictive if the current stabilizer angle of incidence is below the threshold stabilizer angle of incidence. The system may include an elevator actuator configured to move the elevator to a commanded elevator position that is no greater than the elevator position limit.

Also disclosed is a method of controlling an elevator and which may include selecting a factor for increasing or decreasing a predetermined horizontal tail load alleviation (HTLA) authority limit for an elevator based on at least one aircraft parameter. The HTLA authority limit may decrease with an increase in Mach number and/or airspeed. The method may further include computing an elevator position limit as a product of the HTLA authority limit and the factor, and moving the elevator to a commanded elevator position that is no greater than the elevator position limit.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Figure 1:
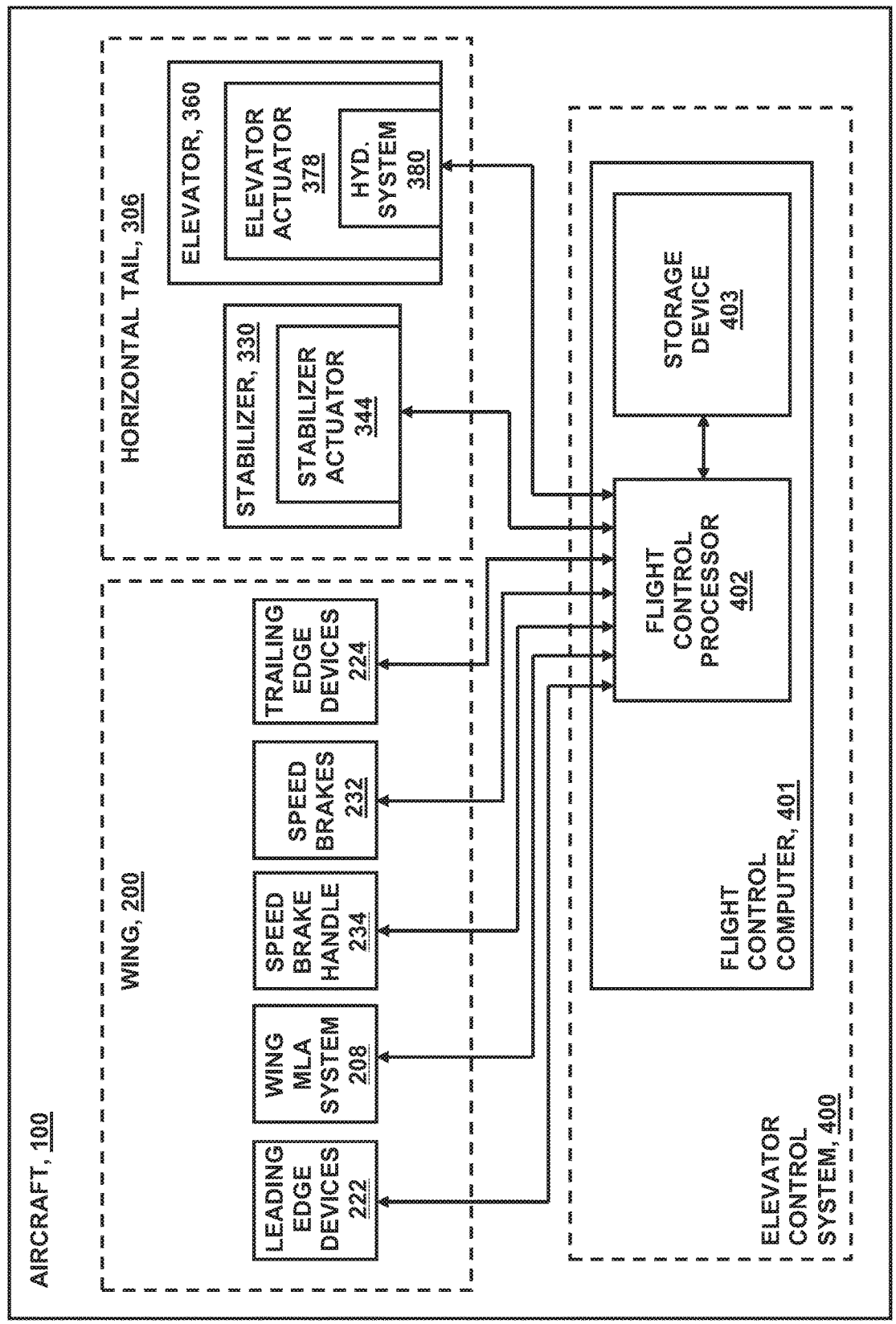
FIG. 1 is a block diagram of a system for controlling an elevator of an aircraft.

Referring now to the drawings wherein the showings are for purposes of illustrating various examples of the present disclosure, shown in FIG. 1 is a block diagram of an elevator control system 400 that may be implemented for controlling an elevator 360 of an aircraft 100. The aircraft 100 may include a pair of wings 200 and a horizontal tail 306. Each wing 200 may include one or more leading and/or trailing edge devices 222, 224 (e.g., flaps 226), which may be used to augment lift characteristics of the wing 200. In some examples, the wings 200 may include leading edge devices 222 such as leading edge slats or Krueger flaps. The wing 200 may also include one or more trailing edge devices 224 such as trailing edge flaps, flaperons 230, and/or ailerons 228. In addition, the wings 200 may include one or more spoilers or speed brakes 232 which may be mounted to a top surface of the wing 200 and for which deployment may be commanded by means of a speed brake handle 234 as part of flight controls (not shown) that may be manipulated by a pilot and/or by an autopilot system (not shown). The wings 200 may further include a wing maneuvering-load-alleviation system 208 for reducing the wing bending moment at the wing root 210 such as by deflecting any one or more of the speed brakes 232, leading edge devices 222, and/or trailing edge devices 224 to vary the wing camber along a spanwise direction 214 and shift the center of lift of the respective wing inboard. In some examples, the wing maneuvering-load-alleviation system 208 may be activated or deployed during cruise flight when the aircraft 100 is performing a maneuver such as during a turn, when the aircraft 100 is subjected to a wind gust, and/or when the load factor (e.g., g-load) on the aircraft 100 increases during changes in pitch of the aircraft 100 such as during a pitch up of the nose, as described below.

The aircraft 100 may further include a horizontal tail 306. The horizontal tail 306 may include a pair of horizontal stabilizers 330. Although described as horizontal stabilizers 330, the stabilizers 330 may be oriented at an angle, and may not necessarily be horizontal. For example, the stabilizers 330 may be oriented in a slightly upward direction relative to horizontal (e.g., dihedral) or a slightly downward direction relative to horizontal (e.g., anhedral). The term horizontal stabilizer and stabilizer may be used interchangeably herein. One or more of the stabilizers 330 may be actuated by one or more stabilizer actuators 344 such as a stabilizer jackscrew (not shown) or other stabilizer actuation mechanism. The stabilizer actuator 344 may be an electromechanical device although the stabilizer actuator 344 may be hydraulically powered. One or more of the stabilizers 330 may include an elevator 360 which may be pivotably coupled to the stabilizer trailing edge 336. Each elevator 360 may be actuated by one or more elevator actuators 378. In some examples, one or more of the elevator actuators 378 may be configured as hydraulic actuators and may be operated as part of a hydraulic system 380 of the aircraft 100. In some examples, the elevator actuators 378 may be configured as electromechanical actuators.

As mentioned above, for pitch maneuvering of an aircraft 100, the elevator 360 may be pivotably moved upwardly or downwardly. For example, to maneuver the aircraft 100 from a nose-up attitude to a level attitude, the elevator 360 may be pivotably deflected or positioned downwardly (e.g., elevator trailing edge down) so that the horizontal tail 306 generates an increased amount of upload (e.g., tail load 308) to bring the nose of the aircraft 100 back down to level. To maneuver the aircraft 100 from a nose-down attitude to a level attitude, the elevator 360 may be pivotably deflected or positioned upwardly (e.g., elevator trailing edge up) so that the horizontal tail 306 generates an increased amount of download (e.g., tail load 308) to bring the nose of the aircraft 100 back up to level. As dynamic pressure on the horizontal stabilizer 330 and elevator 360 increases with increasing airspeed, an increased amount of upload or download is generated by the horizontal tail 306. To avoid exceeding the load-carrying capability of the horizontal tail 306 and fuselage 104, the authority of the elevator 360 may be electronically limited with increasing airspeed. Unfortunately, excessively limiting elevator authority as a function of airspeed to reduce tail loads may result in sub-optimal maneuvering capability.

In FIG. 1, the aircraft 100 may include an elevator control system 400 for controlling the deflection of the elevators 360 within limits that reduce tail loads while providing sufficient authority for pitch control of the aircraft 100. The elevator control system 400 may control the deflection angle or position of the elevators 360 in a manner to reduce tail loads 308 on the horizontal tail 306 and/or fuselage 104 of the aircraft 100 to avoid exceeding the load-carrying capability of the load-carrying structure (not shown) of the horizontal tail 306 and/or fuselage 104. In this regard, the elevator control system 400 may reduce tail loads 308 while providing sufficient pitch control for maneuvering the aircraft 100. In some examples, the elevator control system 400 may include a flight control processor 402 (e.g., a flight management computer). The flight control processor 402 may receive signals regarding the position of one or more control surfaces and the status of one or more systems of the aircraft 100. For example, the flight control processor 402 may receive signals representative of the position and/or deployment level of the control surfaces of the wings 200 such as the position and/or deployment level of the leading edge devices 222, the speed brakes 232, and the trailing edge devices 224.

In some examples, the flight control processor 402 may receive signals representative of the deployment level of the wing maneuvering-load-alleviation system 208. The wing maneuvering-load-alleviation system 208 may include the speed brakes 232, the leading edge devices 222, and/or the trailing edge devices 224, any combination of which may be deflected upwardly and/or downwardly as a means to vary the wing camber to shift the wing loading in an inboard direction and thereby reduce wing bending at the wing root 210. The flight control processor 402 may also receive signals representative of the position of a speed brake handle 234 which may be mounted on a flight deck (not shown) of the aircraft 100 and which may be manipulated by the flight crew, as indicated above. The flight control processor 402 may additionally receive signals representative of the current stabilizer angle of incidence 338 of the horizontal stabilizer 330. For example, the flight control processor 402 may receive a signal from one or more stabilizer sensors (not shown) indicative of the current stabilizer angle of incidence 338.

Referring to FIG. 1, in some examples, the flight control processor 402 may be configured to control the position of the elevators 360 by means of one or more elevator actuators 378. As described in greater detail below, in some examples, the flight control processor 402 may select or compute an elevator position limit 374, 376 (e.g., FIGS. 6-9 and 12) based on the current stabilizer angle of incidence 338. In some examples, the elevator position limits 374, 376 may be electronic position limits computed by the flight control processor 402. The elevator actuators 378 may move the elevators 360 to a commanded elevator position in response to an elevator command initiated by a pilot (e.g., via a control column on the flight deck) or by an autopilot. In some examples, the elevator command may be received by the flight control processor 402. The flight control processor 402 may compare the elevator command to the elevator position limit 374, 376 computed by the flight control processor 402. If the magnitude of the elevator command is within the elevator position limit 374, 376, the elevator command may be sent to the elevator actuators 378 or to a computer or other controller integrated or embedded in the elevator actuators 378. If the magnitude of the elevator command is greater than the elevator position limit 374, 376, the elevator command may be reduced to the value of the elevator position limit 374, 376 prior to the elevator command being sent to the elevator actuators 378 or to a computer embedded in the elevator actuators 378. In other examples, the elevator command may be sent directly to the elevator actuators and if the elevator command exceeds the elevator position limits 374, 376, the elevator actuators may limit movement of the elevator to the magnitude of the elevator position limits 374, 376, in a manner described below.

Figure 2:
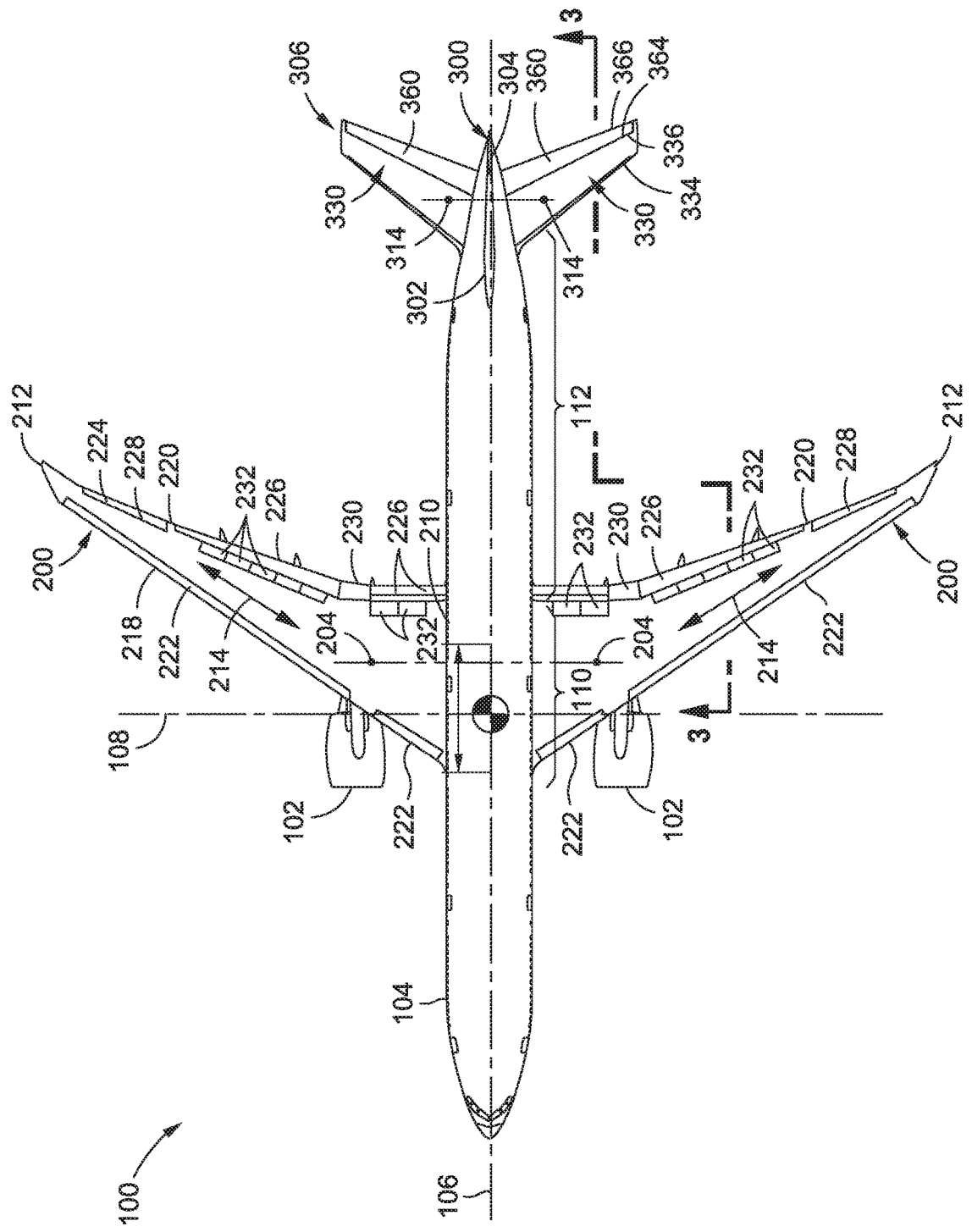
FIG. 2 is a plan view of an aircraft.

FIG. 2 is a plan view of an aircraft 100 that may include any of the examples of an elevator control system 400 disclosed herein. The aircraft 100 may include a fuselage 104 and a longitudinal axis 106 that may extend lengthwise along the fuselage 104. The aircraft 100 may include a lateral axis 108 oriented perpendicular the longitudinal axis 106. The lateral axis 108 may pass through an aircraft center of gravity (CG) 114. The aircraft 100 may pivot about the lateral axis 108 during changes in the pitch attitude of the aircraft 100. The aircraft 100 may have a CG range 116 that may define the forward and aft limits of the aircraft CG 114. The aircraft CG 114 may shift during a flight such as a result of fuel burn, passenger or cargo movement, and/or for other reasons that may cause the aircraft 100 to pivot about the lateral axis 108 thereby causing a change in the aircraft pitch attitude. The wing aerodynamic center 204 (FIG. 2) or center of lift may also shift forward or aft during flight as a result of a change in speed of the aircraft 100, deflection of control surfaces (e.g., leading edge devices 222, trailing edge devices 224, speed brakes 232, ailerons 228, etc.) and/or for other reasons. The shift in the aerodynamic center 204 relative to the aircraft CG 114 may also cause a change in the aircraft 100 pitch attitude.

The aircraft 100 may include a pair of wings 200 that may be attached to the fuselage 104 at a wing root 210. Each one of the wings 200 may extend outwardly in a spanwise direction 214 toward a wing tip 212. In the example shown, the wings 200 are swept aftwardly. In some examples, the aircraft 100 may be configured such that the aerodynamic center 204 (e.g., center of lift) is located aft of the aircraft CG 114 and the pitch axis or lateral axis 108. However, the aerodynamic center 204 may be located forward of the aircraft CG 114 and the lateral axis 108. The wing 200 may include one or more control surfaces such as leading edge devices 222, trailing edge devices 224, and/or speed brakes 232. The leading edge devices 222 may include leading edge slats and/or Krueger flaps 226 or other leading edge device configurations. The trailing edge devices 224 may be trailing edge flaps 226, flaperons 230, ailerons 228, and/or other trailing edge device configurations. Each wing 200 may also include one or more spoilers or speed brakes 232 mounted to the top surface of the wing 200. The aircraft 100 may include one or more propulsion units 102 which may be mounted on the wings 200 or at other locations of the aircraft 100.

As shown in FIG. 2, the aircraft 100 may include an empennage 300 at the aft end of the fuselage 104. The empennage 300 may include a horizontal tail 306 and a vertical tail. The horizontal tail 306 may include one or more horizontal stabilizers 330. Each stabilizer 330 may include an elevator 360 pivotably coupled to the stabilizer 330, as indicated above. The vertical tail may include a vertical stabilizer 302 and a rudder 304 for directional control the aircraft 100. The horizontal tail 306 may be supported by the load-carrying structure of the fuselage 104. The load-carrying structure of the fuselage 104 may include the aft fuselage body structure 112 (e.g., skin, stringers, frames, etc.) and the fuselage center section 110 over the wings 200. Although the elevator control system 400 of the present disclosure is described in the context of a tube-and-wing aircraft 100 as shown in FIG. 2, the elevator control system 400 may be implemented in any aircraft configuration, without limitation.

Figure 3:
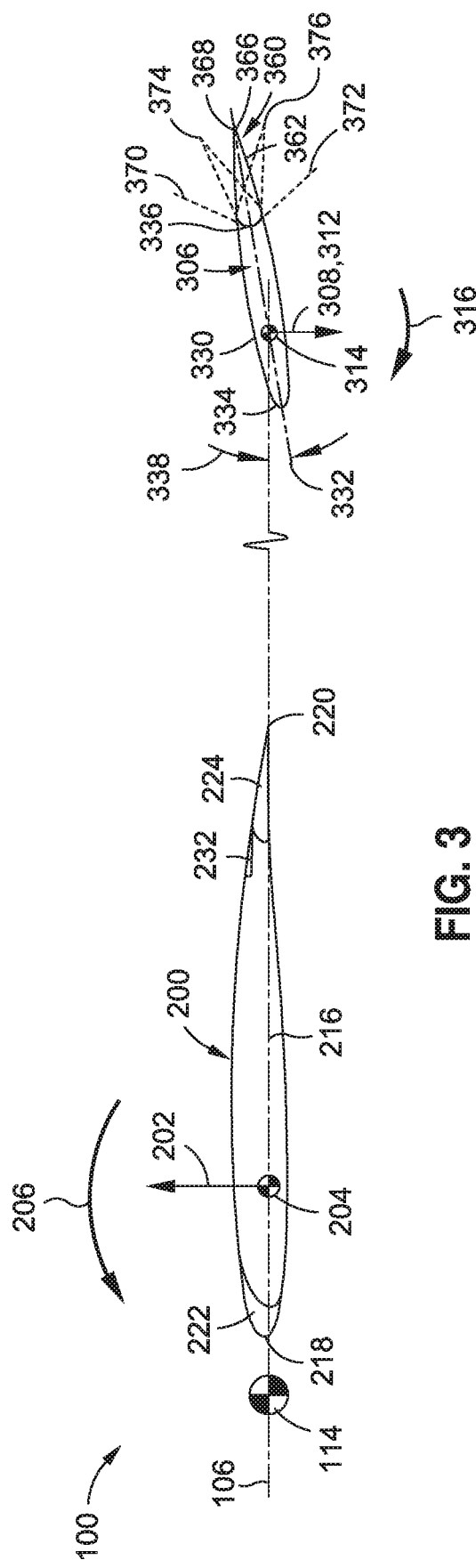
FIG. 3 is a sectional view taken along line 3 of FIG. 2 and schematically illustrating a wing and a horizontal tail wherein the elevator is oriented at a negative angle of incidence.

FIG. 3 is a sectional view of a wing 200 and a horizontal tail 306. The wing 200 may include a wing leading edge device 222 and a wing trailing edge device 224. The wing 200 may include one or more speed brakes 232 shown in a retracted position. In some examples, the wing aerodynamic center 204 (e.g., center of lift) may be located aft of the aircraft CG 114. The wing 200 may generate positive wing lift 202 which may produce a wing pitching moment 206 about the aircraft CG 114. In examples in which the aircraft CG 114 is located forward of the aerodynamic center 204, the positive wing lift 202 of the wings 200 may generate a nose-down wing pitching moment 206. In further examples, the aircraft CG 114 may be located aft of the aerodynamic center 204 in which case the positive wing lift 202 of the wings 200 may generate a nose-up wing pitching moment 206. The wing 200 may have a wing chord 216 extending from the wing leading edge 218 to the wing trailing edge 220, and which may be used to describe the orientation of the wing 200 relative to the longitudinal axis 106. In the example shown, the wing chord 216 is oriented parallel to the longitudinal axis 106 (e.g., the angle of incidence is zero). However, the wing chord 216 may be oriented at an angle of incidence (not shown) relative to the longitudinal axis 106.

In FIG. 3, the horizontal tail 306 includes a horizontal stabilizer 330. The horizontal stabilizer 330 has a stabilizer leading edge 334 and a stabilizer trailing edge 336 defining a stabilizer chord 332. In FIG. 3, the stabilizer chord 332 is oriented at a negative angle of incidence relative to the longitudinal axis 106. As indicated above, the stabilizer 330 may include one or more stabilizer actuators 344 that may be operated to adjust the stabilizer angle of incidence 338 to counteract the pitching moment 206 generated by the wings 200. The stabilizer 330 includes an elevator 360. The elevator 360 may be pivotably coupled to the stabilizer 330. The elevator 360 is shown in solid lines in the neutral position 368. In the neutral position 368, the elevator chord 362 is aligned with the stabilizer chord 332. One or more elevator actuators 378 may be commanded to pivotably move the elevator 360 between an upper elevator position limit 374 and a lower elevator position limit 376. The upper and lower elevator position limits 374, 376 may be determined by a flight control processor 402, as described in greater detail below. When the horizontal stabilizer 330 is oriented at a negative stabilizer angle of incidence 338, the horizontal tail 306 may generate negative lift or a download 312 which may be described as acting at a horizontal tail aerodynamic center 314. The horizontal stabilizer 330 and elevator 360 may be adjusted such that the download 312 provides a nose-up horizontal tail moment 316 to counteract a nose-down wing pitching moment 206 generated by the positive wing lift 202 of the wings 200 such as when the wing aerodynamic center 204 is located aft of the aircraft CG 114.

Figure 4:
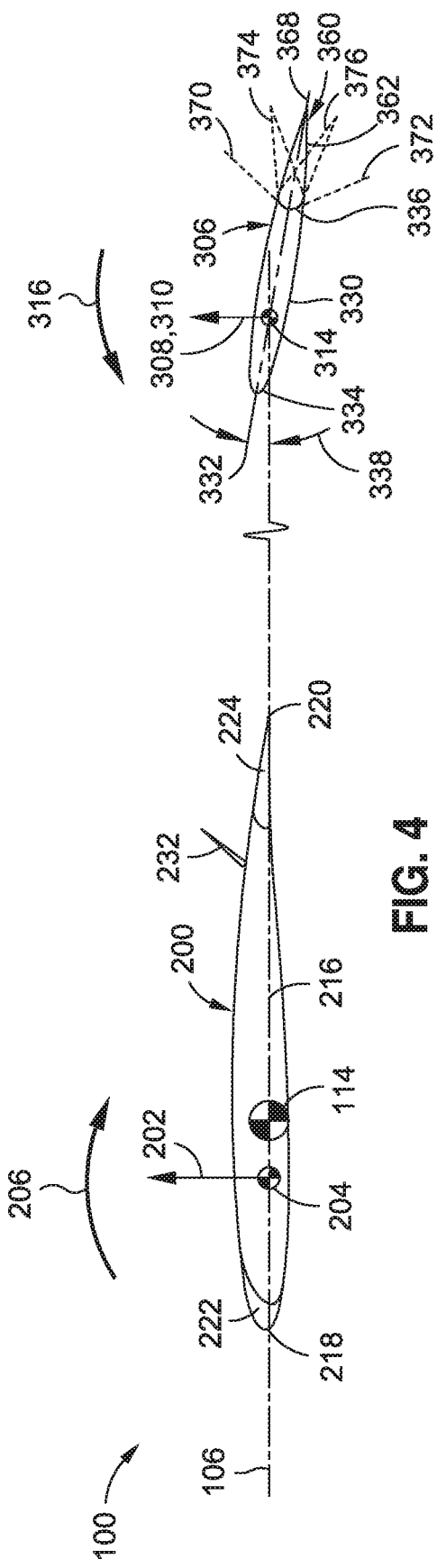
FIG. 4 is a sectional view of the wing and horizontal tail wherein the elevator is oriented at a positive angle of incidence.

FIG. 4 is a sectional view of a wing 200 and a horizontal tail 306. The wing 200 is shown with the speed brake 232 deployed. The stabilizer chord 332 is oriented at a positive angle of incidence relative to the longitudinal axis 106. The elevator 360 is shown in solid lines in the neutral position 368. With the horizontal stabilizer 330 oriented at a positive stabilizer angle of incidence 338, the horizontal tail 306 may generate positive wing lift 202 or an upload 310 acting at the horizontal tail aerodynamic center 314. The horizontal stabilizer 330 and/or the elevator 360 may be adjusted such that the upload 310 provides a nose-down horizontal tail moment 316 to counteract a nose-up wing pitching moment 206 generated by the positive wing lift 202 of the wings 200 such as when the wing aerodynamic center 204 is located aft of the aircraft CG 114 and/or due to a nose-up pitching moment generated by the speed brakes 232 when deployed.

Figure 5:
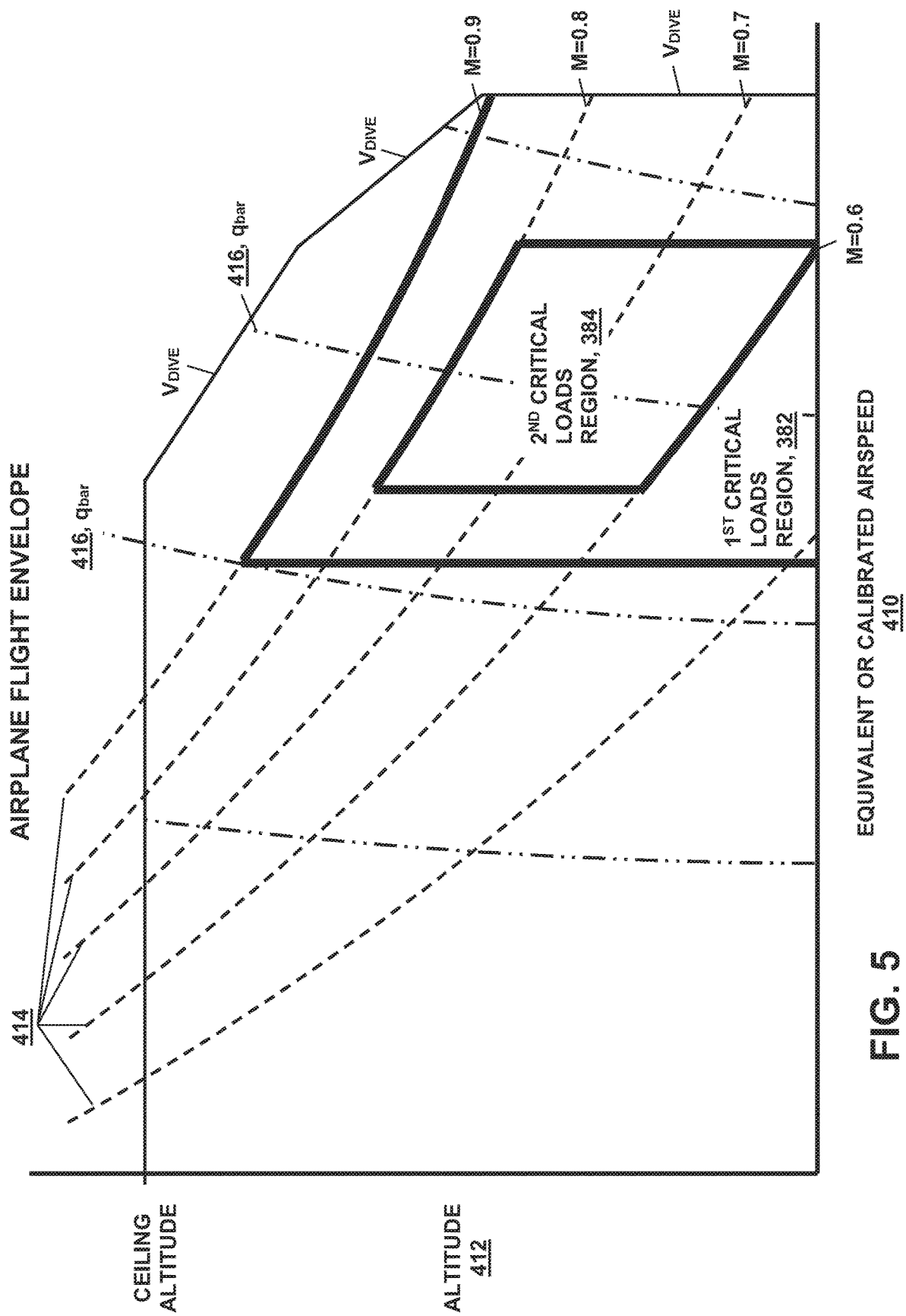
FIG. 5 is a graph of an operating envelope for an aircraft and illustrating flight regimes for which movement of the elevator may be limited based upon Mach number, airspeed, dynamic pressure, and/or altitude.

FIG. 5 shows a graph of an example operating envelope of an aircraft 100 and illustrating flight regimes or critical loads regions for which movement of the elevator 360 may be limited based upon Mach number 414, airspeed 410, dynamic pressure 416, and/or altitude 412, as described below. In the example shown, the critical loads regions include a first critical loads region 382 and a second critical loads region 384. The critical loads regions 382, 384 may be determined based upon strength analyses and/or testing to identify the load-carrying capability of the horizontal tail 306 and fuselage 104 in response to tail loads 308 at the noted operating parameters (e.g., Mach number 414, airspeed 410, dynamic pressure 416, and altitude 412) and wherein such tail loads 308 on the aircraft 100 may approach the load-carrying capability of the horizontal tail 306 and/or fuselage 104. In the example graph shown, the first and second critical loads regions 382, 384 may be based on airspeed 410 and Mach number 414. However, any one or more of the parameters of Mach number 414, airspeed 410, dynamic pressure 416, and/or altitude 412, taken alone or in any combination with one another, may be used to define a critical loads region. For example, a critical loads region may be defined by (e.g., bounded by) dynamic pressure (e.g., qbar) 416 and Mach number 414, or a critical loads region may be defined by altitude 412 and airspeed 410, or any other combination of Mach number 414, airspeed 410, dynamic pressure 416, and altitude 412. In the example shown, the first and second critical loads regions 382, 384 have a respective reduction factor of 0.8 and 0.7 which may be used for computing the upper and lower elevator position limits 374, 376, as described below. As may be appreciated, the operating envelope of an aircraft 100 may include any number of critical loads regions. The reduction factor of each critical loads region may have any value, without limitation.

Figure 6:
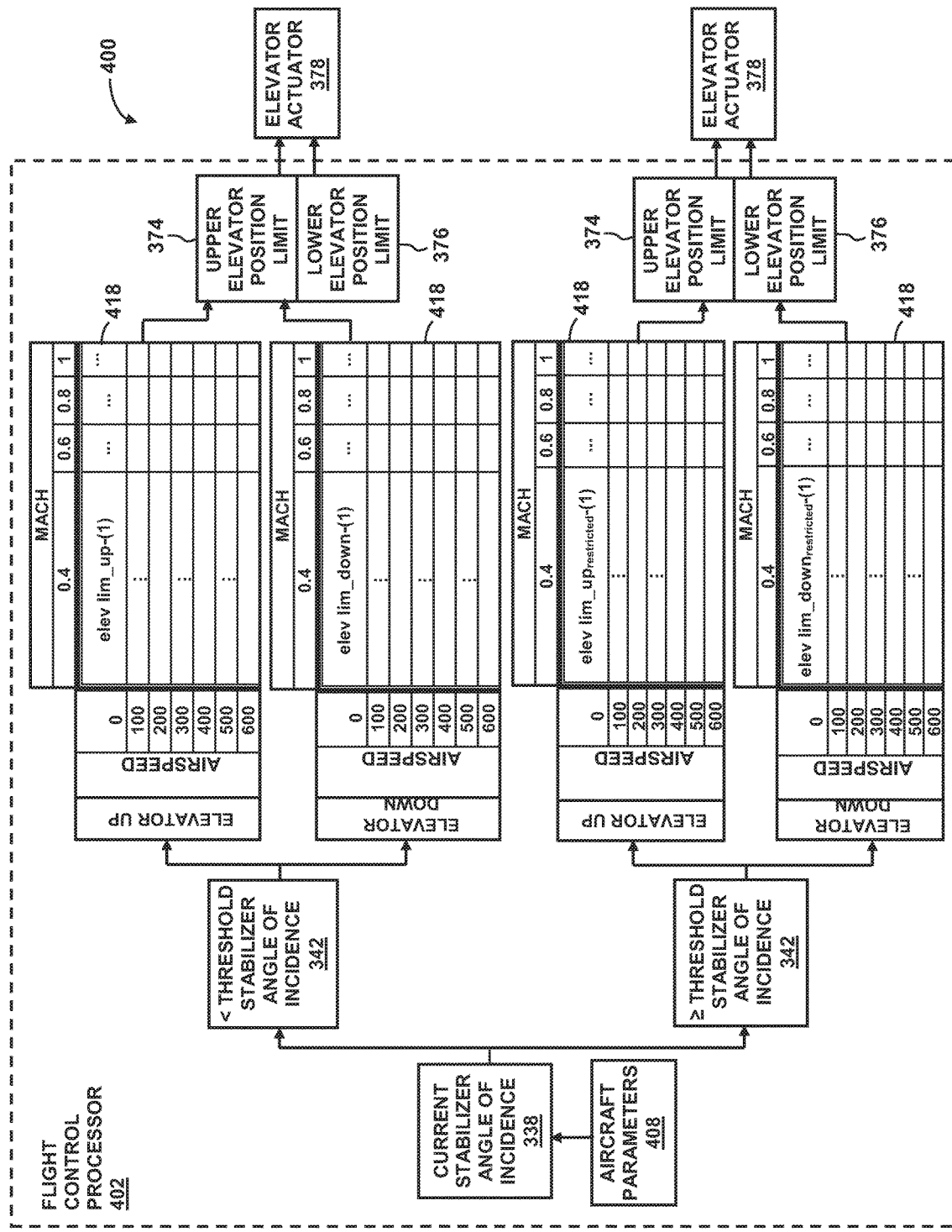
FIG. 6 is a schematic illustration of an example of a system for computing an elevator position limit based upon a current stabilizer angle of incidence of a stabilizer of the horizontal tail.

FIG. 6 shows an example of an elevator control system 400 wherein the elevator 360 position is adjusted as a function of the current angle of incidence 338 of the horizontal stabilizer 330. The elevator control system 400 may limit the elevator 360 position (e.g., the range of motion of the elevator) as a means to avoid excessive tail loads 308 in the horizontal tail 306 and/or in the fuselage 104 (FIG. 1) while providing sufficient nose-up and nose-down maneuverability of the aircraft 100 (FIG. 1) to maintain pitch control of the aircraft 100. In the present disclosure, the tail loads 308 may be described as the loads transmitted through the load-carrying structure of the horizontal tail 306 including the stabilizer 330 and the elevator 360. In addition, the tail loads 308 may include loads transmitted through the load-carrying structure of the aft fuselage body structure 112 (FIG. 1) including the fuselage skin, longitudinal stringers, and circumferential frames, and may further include the loads in the fuselage center section 110 such as in the over-wing body structure of the fuselage 104. In addition, the tail loads 308 may include structural loads imposed on or carried by the stabilizer actuators 344 and the elevator actuators 378, and may further include loads on hinges, pivots, and any other structure or equipment that may transmit tail loads 308.

In FIG. 6, the flight control processor 402 may receive a stabilizer signal representative of the current stabilizer angle of incidence 338. In some examples, the current stabilizer angle of incidence 338 may be described as a proxy for the position of the speed brakes 232 in the sense that the current stabilizer angle of incidence 338 may be indicative of whether the speed brakes 232 are retracted or deployed. In some examples, deployment of the speed brakes 232 may represent an aircraft 100 configuration wherein the horizontal tail 306 may be susceptible to relatively high tail loads 308 in comparison to tail loads 308 when the speed brakes 232 are retracted. The flight control processor 402 may receive the stabilizer signal from one or more stabilizer sensors, and compute an elevator position limit 374, 376 based on the current stabilizer angle of incidence 338.

The elevator position limit 374, 376 may be described as the position (e.g., the deflection angle) of the elevator 360 relative to the neutral position 368 (FIGS. 3-4) of the elevator 360. The flight control processor 402 may compute an upper elevator position limit 374 and a lower elevator position limit 376, and which may be transmitted to one or more elevator actuators 378 such as via the flight control processor 402. An elevator actuator 378 may pivotably move the elevator 360 to a commanded elevator position that is no greater than the upper and lower elevator position limits 374, 376. The commanded elevator position may be commanded by a pilot and/or an autopilot using an elevator control input 406 device in communication with the elevator actuators 378. The elevator control input 406 device may be a control column (not shown) located on a flight deck (not shown) of an aircraft 100. In some examples, the flight control processor 402 may compare a pilot-initiated or autopilot-initiated elevator command to the upper and lower elevator position limits 374, 376, and if the elevator command exceeds the upper and lower elevator position limits 374, 376, the flight control processor 402 may reduce the magnitude of the elevator command prior to sending the elevator command to the elevator actuators 378. In further examples, the elevator command may be sent directly to the elevator actuators 378 using an elevator control input 406 device. Prior to actuation of the elevators 360, the elevator actuators 378 may reduce the magnitude of the elevator command to a magnitude that does not exceed the upper and lower elevator position limits 374, 376, as described below.

As indicated above, the horizontal stabilizer 330 may be positioned at a current stabilizer angle of incidence 338 such that the horizontal tail moment 316 counteracts the wing pitching moment 206. In this manner, the aircraft 100 may be trimmed to maintain a substantially constant pitch angle. The current stabilizer angle of incidence 338 may be based on one or more aircraft parameters. For example, the current stabilizer angle of incidence 338 may be based on airspeed, Mach number, dynamic pressure, current aircraft gross weight, current aircraft CG location, current aircraft pitch rate, speed brake position (e.g., retracted or deployed, and angle of deployment), thrust setting of the propulsion units 102, activation status of a wing maneuvering-load-alleviation system 208 (e.g., inactive or active, and level of deployment), and any one of a variety of other aircraft parameters upon which the current stabilizer angle of incidence 338 may be based. The current stabilizer angle of incidence 338 may be commanded by a pilot or an autopilot using a stabilizer control device (not shown) in communication with the flight control processor 402 and/or in communication with one or more stabilizer actuators 344 (FIG. 1).

As shown in FIG. 6, the flight control processor 402 may receive a threshold stabilizer angle of incidence 342, which may be stored in a date storage device of aircraft 100 (e.g., storage device 403 of the flight control computer 401 of aircraft 100). One or more threshold stabilizer angles of incidence 342 may be stored, each associated with a given flight condition, aircraft type, aircraft configuration and/or one or more flight parameters. The flight control processor 402 may compare the threshold stabilizer angle of incidence 342 with the current stabilizer angle of incidence 338, which may be above or below the threshold stabilizer angle of incidence 342. The threshold stabilizer angle of incidence 342 may be described as an angle of incidence that represents whether the speed brakes 232 are retracted (see e.g., FIG. 3) or deployed (see e.g., FIG. 4).

In this regard, the threshold stabilizer angle of incidence 342 may be described as the value below which the speed brakes 232 are presumed to be retracted for purposes of computing elevator position limits 374, 376. For example, the threshold stabilizer angle of incidence 342 may be positive 1 degree relative to the longitudinal axis 106 (FIG. 1) of the aircraft 100. In such examples, a current stabilizer angle of incidence 338 which is less than positive 1 degree may represent that the speed brakes 232 are retracted. A current stabilizer angle of incidence 338 of positive 1 degree or higher may represent that the speed brakes 232 are deployed. In further examples, the threshold stabilizer angle of incidence 342 may be different than positive 1 degree. For example, the threshold stabilizer angle of incidence 342 for one type of aircraft may be positive 2 degrees relative to the longitudinal axis 106 of the aircraft 100, and the threshold stabilizer angle of incidence 342 for another type of aircraft may be 0 degrees relative to the longitudinal axis 106 of the aircraft 100. Deployment of the speed brakes 232 may generate a nose-up pitching moment which may reduce the nose-down wing pitching moment 206 generated by the wing lift 202. In this regard, when the speed brakes 232 are deployed, the stabilizer 330 may be positioned at a stabilizer angle of incidence 338 that results in the horizontal tail 306 generating a smaller amount of download 312, or generating an upload 310, to counteract a reduction in nose-down wing pitching moment 206 when the speed brakes 232 are deployed.

The flight control processor 402 may compare the current stabilizer angle of incidence 338 with the threshold stabilizer angle of incidence 342 and select an elevator position limit 374, 376 that is more restrictive if the current stabilizer angle of incidence 338 is equal to or greater than the threshold stabilizer angle of incidence 342, and less restrictive if the current stabilizer angle of incidence 338 is below the threshold stabilizer angle of incidence 342. The flight control processor 402 may compute a plurality of elevator position limits 374, 376 which may be stored in lookup tables (e.g., lookup tables 418, as illustrated in the example in FIG. 6). The flight control processor 402 may compute upper and lower elevator position limits 374, 376 for any one parameter or any given combination of parameters (e.g., Mach number, airspeed, etc.) and may store the upper and lower elevator position limits 374, 376 in respective lookup tables 418 (e.g., an elevator-up lookup table and an elevator-down lookup table). In further examples, the plurality of elevator position limits 374, 376 may be computed in advance (e.g., prior to flight) and may be preprogrammed into a flight control computer 401 (e.g., stored in lookup tables in storage device 403) for access by the flight control processor 402 during flight. The values of the upper and lower elevator position limits 374, 376 may be based upon the current stabilizer angle of incidence 338 in that less restrictive values may be computed for the elevator position limits 374, 376 if the current stabilizer angle of incidence 338 is less than the threshold stabilizer angle of incidence 342, and more restrictive values may be computed for the elevator position limits 374, 376 if the current stabilizer angle of incidence 338 is greater than or equal to the threshold stabilizer angle of incidence 342. Pairs of lookup tables may be generated for the plurality of sets of upper elevator position limits and lower elevator position limits. For example, a first pair of lookup tables may contain upper elevator position limits and a second pair of lookup tables may contain lower elevator position limits. The first and second pair of lookup tables in FIG. 6 may each include a first table of elevator position limits (e.g., elev lim_up-(1), elev lim_down-(1)) for situations in which the current stabilizer angle of incidence is less than the threshold stabilizer angle of incidence, and a second table of elevator position limits (e.g., elev lim_up$_{restricted}$-(1), elev lim_down$_{restricted}$-(1)) for situations in which the current stabilizer angle of incidence is greater than or equal to the threshold stabilizer angle of incidence.

In FIG. 6, upper elevator position limits 374 and lower elevation position limits 376 may be selected based upon the value of the current stabilizer angle of incidence 338 relative to the threshold stabilizer angle of incidence 342 for a given Mach number and airspeed. That is, a plurality of upper and lower elevator position limits 374, 376 may be computed, each for a given combination of airspeed and Mach number. The specific examples of values for Mach number and airspeed in FIG. 6, as well as in FIGS. 7-12, do not represent an exclusive list of possible values but are provided for illustration purposes only. In other examples, the Mach number and airspeed values may be different. In further examples, as described above, the flight control processor 402 may compute the upper and lower elevator position limit 374, 376 based upon any combination of parameters including Mach number, airspeed, altitude, dynamic pressure, or any combination thereof, and is not limited to computing the upper and lower elevator position limit 374, 376 based upon Mach number and airspeed. For example, the upper and lower elevator position limit 374, 376 may be computed based solely on Mach number, or airspeed, or altitude. In another example, the upper and lower elevator position limit 374, 376 may be computed based solely on dynamic pressure.

In any of the examples disclosed herein, airspeed may be described as the equivalent airspeed of the aircraft or the calibrated airspeed of the aircraft. Equivalent airspeed may be described as the speed of an aircraft at sea level that would produce the same magnitude of dynamic pressure as the dynamic pressure at the true airspeed and altitude at which the aircraft is flying. Calibrated airspeed may be described as the indicated airspeed (e.g., as indicated by an airpseed indicator on an instrument panel) corrected for instrument errors, and corrected for position errors and installation errors at the airspeed sensor (e.g., at a pitot tube mounted on the aircraft exterior).

Referring still to FIG. 6, the stabilizer signal may include a magnitude of the current stabilizer angle of incidence 338. The flight control processor 402 may receive the stabilizer position signal from one or more stabilizer sensors (not shown) and may compare the magnitude of the current stabilizer angle of incidence 338 with the threshold stabilizer angle of incidence 342. The flight control processor 402 may select and/or compute in real-time elevator position limits 374, 376 that are more restrictive for relatively high values of the current stabilizer angle of incidence 338, and less restrictive for relatively low values of the current stabilizer angle of incidence 338. For the example, for a given Mach number and/or airspeed, for a current stabilizer angle of incidence 338 of positive 5 degrees, the flight control processor 402 may select an upper elevator position limit 374 of +10 degrees and a lower elevator position limit 376 of −10 degrees. However, for a current stabilizer angle of incidence 338 of positive 1 degree, the flight control processor 402 may select an upper elevator position limit 374 of +18 degrees and a lower elevator position limit 376 of −18 degrees.

In some examples, the elevator position limits 374, 376 may be proportional to the magnitude of the current stabilizer angle of incidence 338. In some cases, the elevator position limits 374, 376 may be linearly proportional to the magnitude of the current stabilizer angle of incidence 338. In yet further examples, the elevator position limits 374, 376 may generally decrease (e.g., may be more restrictive) with increasing airspeed for a given Mach number, or the upper and/or lower elevator position limits 374, 376 may increase (e.g., may be less restrictive) for an increase in airspeed for a given Mach number. The upper and/or lower elevator position limits 374, 376 may likewise increase (e.g., may be less restrictive) for an increase in dynamic pressure, altitude, or any combination of Mach number, airspeed, dynamic pressure, and altitude.

In some examples, for a given Mach number and airspeed, the absolute value (also referred to herein as magnitude) of the elevator position limits may be the same in both the up and down direction. However that need not be the case as will be described further below. As described herein, the absolute value of the elevator position limits 374, 376 for the case where the current stabilizer angle of incidence 338 is less than the threshold stabilizer angle of incidence 342, are higher than the absolute value of the elevator position limits 374, 376 for the case where the current stabilizer angle of incidence 338 is equal to or greater than the threshold stabilizer angle of incidence 342. The elevator position limits 374, 376 may be the same or they may be different for different Mach numbers for a given airspeed. For example, the flight control processor 402 may compute more restrictive elevator position limits 374, 376 as Mach number increases and/or less restrictive elevator position limits 374, 376 as Mach number increases. The flight control processor 402 may also compute elevator position limits 374, 376 solely as a function of Mach number, or airspeed, or dynamic pressure, or altitude. The flight control processor 402 may also compute elevator position limits 374, 376 as a function of any combination of the parameters of Mach number, airspeed, dynamic pressure, and altitude.

In further examples, the flight control processor 402 may also be configured to compute and/or select elevator position limits 374, 376 that are more restrictive in the direction of the current stabilizer angle of incidence 338, which may serve as means to reduce tail loads 308 relative to the tail loads 308 generated in an arrangement where the elevator position limits 374, 376 have the same value in the positive direction as in the negative direction. Due to the tail lift (e.g., positive or negative) generated by the horizontal tail 306 being greater in the direction of orientation of the stabilizer 330, the elevator position limits 374, 376 may be more restrictive in the direction of the current stabilizer angle of incidence 338. In this manner, tail loads 308 may be reduced while the elevator position limits 374, 376 provide enough pitch maneuverability to allow the aircraft 100 to recover from a nose-up or nose-down pitch attitude. In some examples, the flight control processor 402 may compute and/or select elevator position limits 374, 376 that are more restrictive for a higher magnitude (e.g., absolute value) of the current stabilizer angle of incidence, and compute elevator position limits 374, 376 that are less restrictive for a lower magnitude (e.g., absolute value) of the current stabilizer angle of incidence.

In some examples, the magnitude of the upper elevator position limit 374 may be different from the magnitude of the lower elevator position limit 376. For example, if the current stabilizer angle of incidence 338 is above the threshold stabilizer angle of incidence 342, the flight control processor 402 may compute and/or select elevator position limits 374, 376 that are more restrictive in the positive direction than in the negative direction. In an example, if the current stabilizer angle of incidence 338 is higher than the threshold stabilizer angle of incidence 342, the flight control processor 402 may compute an upper elevator position limit 374 of 8 degrees for an aircraft 100 moving at Mach 0.6 and airspeed 600 miles per hour (mph), and a lower elevation position limit of 10 degrees for the same Mach and airspeed. If the current stabilizer angle of incidence 338 is lower than the threshold stabilizer angle of incidence 342, the flight control processor 402 may compute an elevator position limit 374, 376 that is more restrictive in the negative direction than in the positive direction. For example, if the current stabilizer angle of incidence 338 is lower than the threshold stabilizer angle of incidence 342, the flight control processor 402 may compute and/or select an upper elevator position limit 374 of 10 degrees for an aircraft 100 moving at Mach 0.6 and airspeed 600, and a lower elevation position limit 376 of 8 degrees for the same Mach and airspeed.

In some examples, an elevator command initiated by a pilot or autopilot may be sent directly to the elevator actuators 378, bypassing the flight control processor 402. The elevator command may be reduced based on the stabilizer angle of incidence 342, and based on Mach number, airspeed, dynamic pressure, and/or altitude. The elevator command may be sent directly to one or more of the elevator actuators 378 to reduce the hydraulic pressure capability or blow-down limit inside the hydraulic elevator actuators 378. In some examples, the reduction factor may be computed by an elevator computer (not shown) in response to inputs regarding stabilizer angle of incidence, Mach number, airspeed, dynamic pressure, and/or altitude. The reduction in the hydraulic pressure capability of the elevator actuators 378 may be analogous to the above-described electronic position limit of the elevators, and may be implemented in the event of the outage of a main computer of the aircraft 100, or other condition of the aircraft 100.

Figure 7:
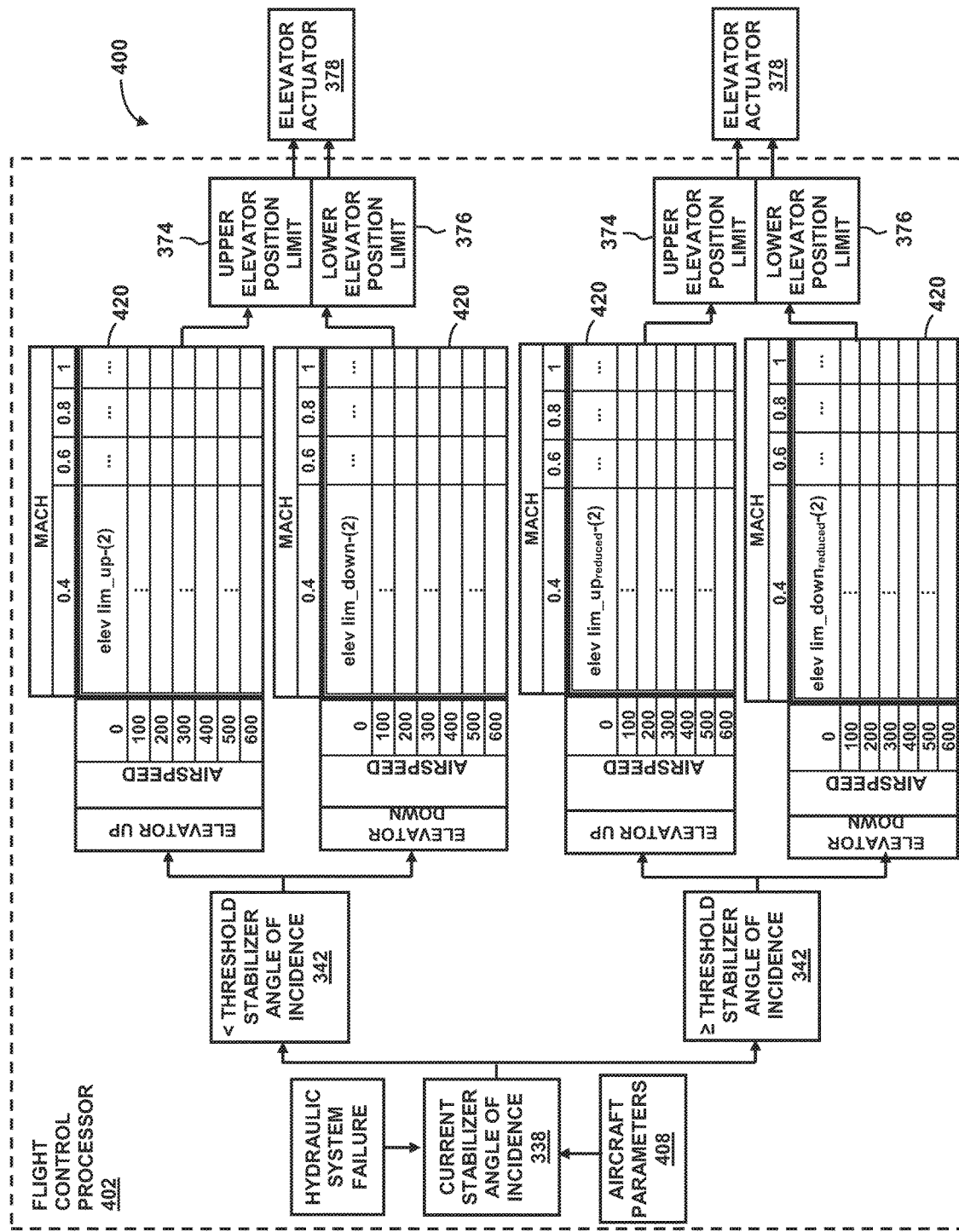
FIG. 7 is a schematic illustration of an example of a system for computing an elevator position limit based upon a current stabilizer angle of incidence and a failure of a hydraulic system of one or more elevator actuators.

FIG. 7 shows an elevator control system 400 according to further examples of the present disclosure. The elevator control system 400 may be operable to compute elevator position limits 374, 376 based upon the current stabilizer angle of incidence 338 in a manner similar to the elevator control system 400 shown in FIG. 6 and described above. The elevator control system 400 shown in FIG. 7 is further configured to accommodate a failure of one or more hydraulic systems 380 (e.g., hydraulic systems described previous with respect to FIGS. 1-3). For example, the aircraft 100 may include left and right elevators 360 which may each include a dedicated, independent hydraulic elevator actuator 378 that may be in fluid communication with a central hydraulic system (not shown). Each one of the hydraulic actuators may be configured such that if hydraulic pressure is lost such as due to loss of a propulsion unit 102 (FIG. 1), one or more of the hydraulic actuators may remain operative to provide the ability to move at least one of the elevators 360 (e.g., the left elevator or the right elevator) so that pitch control of the aircraft 100 can be maintained. In such a scenario, the deflection capability of one or both of the elevators 360 may be increased at the risk of temporarily exceeding the design-allowable load-carrying capability of the horizontal tail 306 and/or fuselage 104. In some examples, it may be desirable to increase the deflection capability of the elevator on one side of the vertical tail (e.g., the left elevator) to increase maneuvering capability because the elevator on the opposite side of the vertical tail (e.g., the right elevator) is not working properly or is non-functional. In still other examples, it may be desirable to decrease the deflection capability of one elevator (e.g., the left elevator) if the opposite elevator (e.g., the right elevator) is non-functional in order to avoid a structural failure of the tail due to a relatively high rolling moment due to asymmetrical elevator input. As illustrated in FIG. 7, the elevator control system 400 may be configured to select upper and/or lower elevator position limits 374, 376 which take into account a failure of one or more hydraulic systems. The flight control processor may access lookup tables 420 which include elevator position limits 374, 376 associated with a hydraulic system failure scenario. The elevator position limits 374, 376 associated with a hydraulic system failure scenario (e.g., elev lim_up-(2), elev lim_down-(2), elev lim_up$_{reduced}$-(2), elev lim_down$_{reduced}$-(2)) may be less restrictive than elevator position limits 374, 376 associated with the non-failure scenario shown in FIG. 6. The flight control processor 402 may be further configured to select an elevator position limit 374, 376 from lookup table 420 in response to receiving a signal or indication of a hydraulic system failure.

Figure 8:
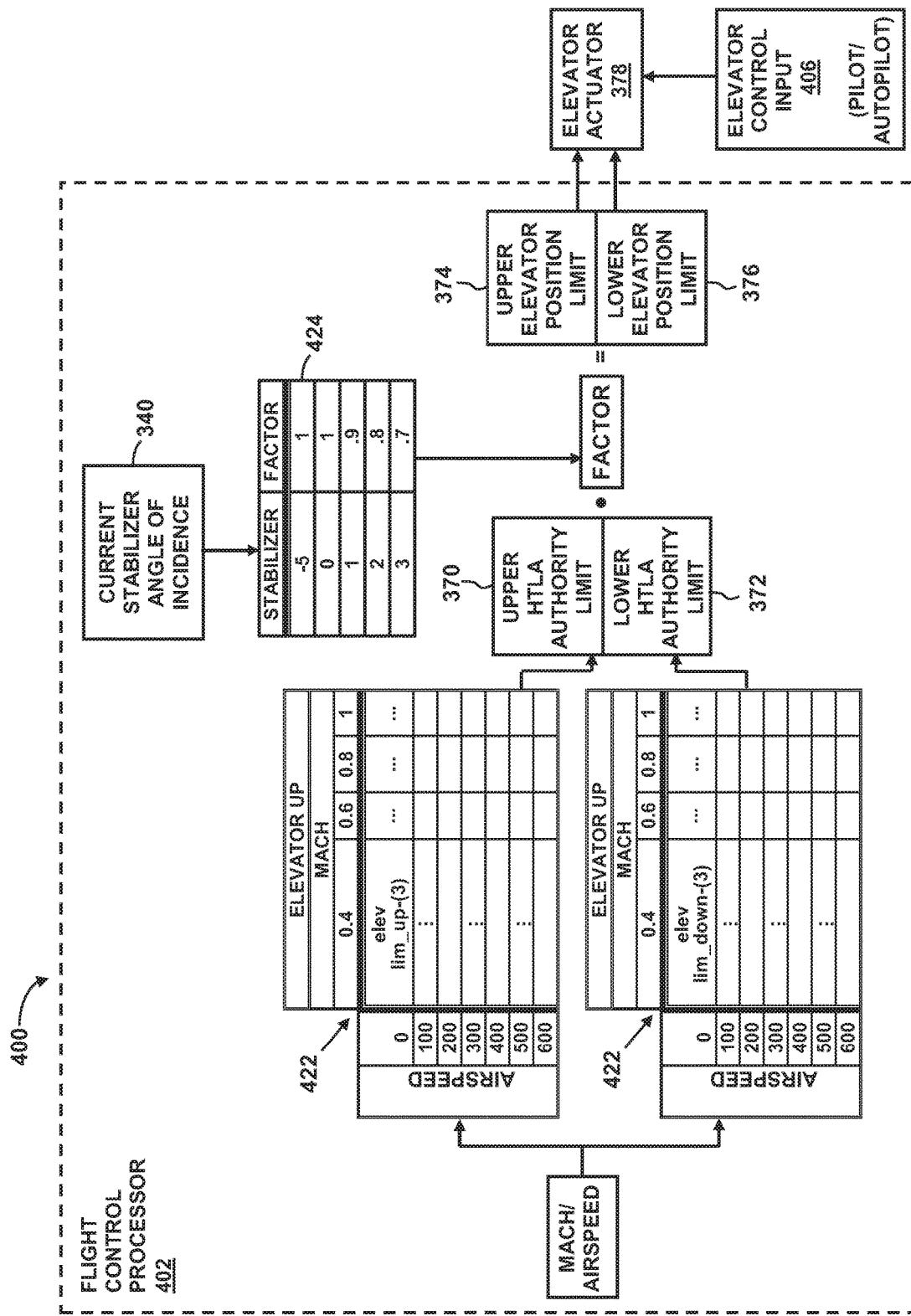
FIG. 8 is a schematic illustration of an example of a system for controlling an elevator of an aircraft by selecting a factor (e.g. a single factor for both the upper and lower limit, or a different factor for each of the upper and lower limit) for increasing or decreasing a predetermined set of horizontal tail load alleviation (HTLA) authority limits based upon a current stabilizer angle of incidence.

FIG. 8 is a schematic illustration of a further embodiment of an elevator control system 400 for controlling an elevator 360 of a horizontal tail 306 of an aircraft 100. The system 400 of FIG. 8 may be operated based upon a predetermined set of horizontal tail load alleviation (HTLA) authority limits which may be scheduled according to Mach and/or airspeed. The HTLA authority limits may be computed using known load alleviation processes for limiting movement of control surfaces based on a loading of the control surface, for example as described in U.S. Pat. No. 8,342,445, assigned to applicant and incorporated herein by reference in its entirety for any purpose. The HTLA authority limits may be stored in a set of lookup tables 422. The HTLA authority limits 370, 372 may be described as electronic limits that restrict the deflection capability of the elevators 360 from their maximum positions which may be determined by mechanical limits or stops (not shown) for the elevators 360. The HTLA authority limits 370, 372 may increasingly restrict elevator movement (e.g., deflection angle) with increasing Mach and/or airspeed as the effectiveness of the elevator 360 increases due to increasing dynamic pressure. In this manner, the elevator control system 400 may prevent movement of the elevator 360 to excessively high deflection angles that may result in tail loads 308 approaching the structural load-carrying capability of the tail, the tail supporting structure, the fuselage, and other structures and equipment including, but not limited to, the stabilizer actuators 344 and elevator actuators 378 and associated hardware.

In FIG. 8, the flight control processor 402 may be preprogrammed with the predetermined set of upper and lower HTLA authority limits 370, 372 as listed in the lookup tables 422 (e.g., elev lim_up-(3), elev lim_down-(3)). In some examples, the flight control processor 402 may compute the HTLA authority limits 370, 372 in real time (e.g., during flight) and store the computed HTLA authority limits in lookup tables 422. The flight control processor 402 may select a factor for increasing or decreasing the predetermined set of HTLA authority limits 370, 372 for different elevator 360 positions based upon one or more aircraft parameters. The flight control processor 402 may compute upper and lower elevator position limits 374, 376 as a product of the factor and the upper and lower HTLA authority limits 370, 372. The upper and lower elevator position limits 374, 376 may be transmitted to one or more elevator actuators 378. A commanded elevator position may be commanded by a pilot or an autopilot using an elevator control input 406 device in communication with the elevator actuators 378, as described above. The one or more elevator actuators 378 may move the elevator 360 to a commanded elevator position that is no greater than the upper and lower elevator position limits 374, 376 such that excessive tail loads 308 are avoided while retaining pitch maneuverability for the aircraft 100.

In the example of FIG. 8, the aircraft parameter 408 upon which the factor is based is the current stabilizer angle of incidence 338 of the stabilizer 330. As indicated above, the current stabilizer angle of incidence 338 may be described as a proxy for the position of the speed brakes 232. The flight control processor 402 may receive a signal representative of the current stabilizer angle of incidence 338, and may compute a factor for the current stabilizer angle of incidence 338. FIG. 8 shows a lookup table 424 containing a listing of factors, each of which may correspond to, or which may be computed for, a given stabilizer angle of incidence 338. In some examples, the magnitude of the factor may increase with an increase in the current stabilizer angle of incidence 338 as a means to limit the tail loads 308 as the current stabilizer angle of incidence 338 moves in a positive direction. In some embodiments, a single set of factors may be provided for calculating both the upper and lower elevator position limit 374, 376. In other embodiments, one set of factors may be provided for determining the upper elevator position limit 374, and a different set of factors may be provided for determining the lower elevator position limit 376.

Although the factors listed in the lookup tables 424 of FIG. 8 are based upon the current stabilizer angle of incidence 338, in a further embodiment not shown, the elevator control system 400 may be configured such that the factors are based upon the deployment setting of one or more other types of control surfaces, and are not limited to factors based upon the current stabilizer angle of incidence 338. For example, the elevator control system 400 may include a lookup table (not shown) of factors based upon the position of one or more wing leading edge devices 222, one or more wing trailing edge devices 224, or a combination of any of a variety of leading and trailing edge devices 222, 224 (FIG. 1-2) or other control surfaces that may have an effect on the wing pitching moment 206 and may therefore affect the magnitude of the tail loads. For example, the factors may be based at least in part upon the position of the speed brakes 232 (see FIGS. 1-2) mounted on the wings 200. As described above, deployment of the speed brakes 232 on a swept wing aircraft may generate a nose-up wing pitching moment 206 (see FIG. 4). The elevator control system 400 may be configured to compute or apply one or more factors to the upper and lower HTLA authority limits 370, 372 to determine the upper and lower elevator position limits 374, 376 based on the deployment setting of the speed brakes 232 alone, or in combination with the current stabilizer angle of incidence 338, or any one or various combinations deployment setting for other wing control surfaces such as speed brakes 232, leading edge devices 222, and trailing edge devices 224, or any other aircraft surface(s) or device(s) that may affect the wing pitching moment 206.

Figure 9:
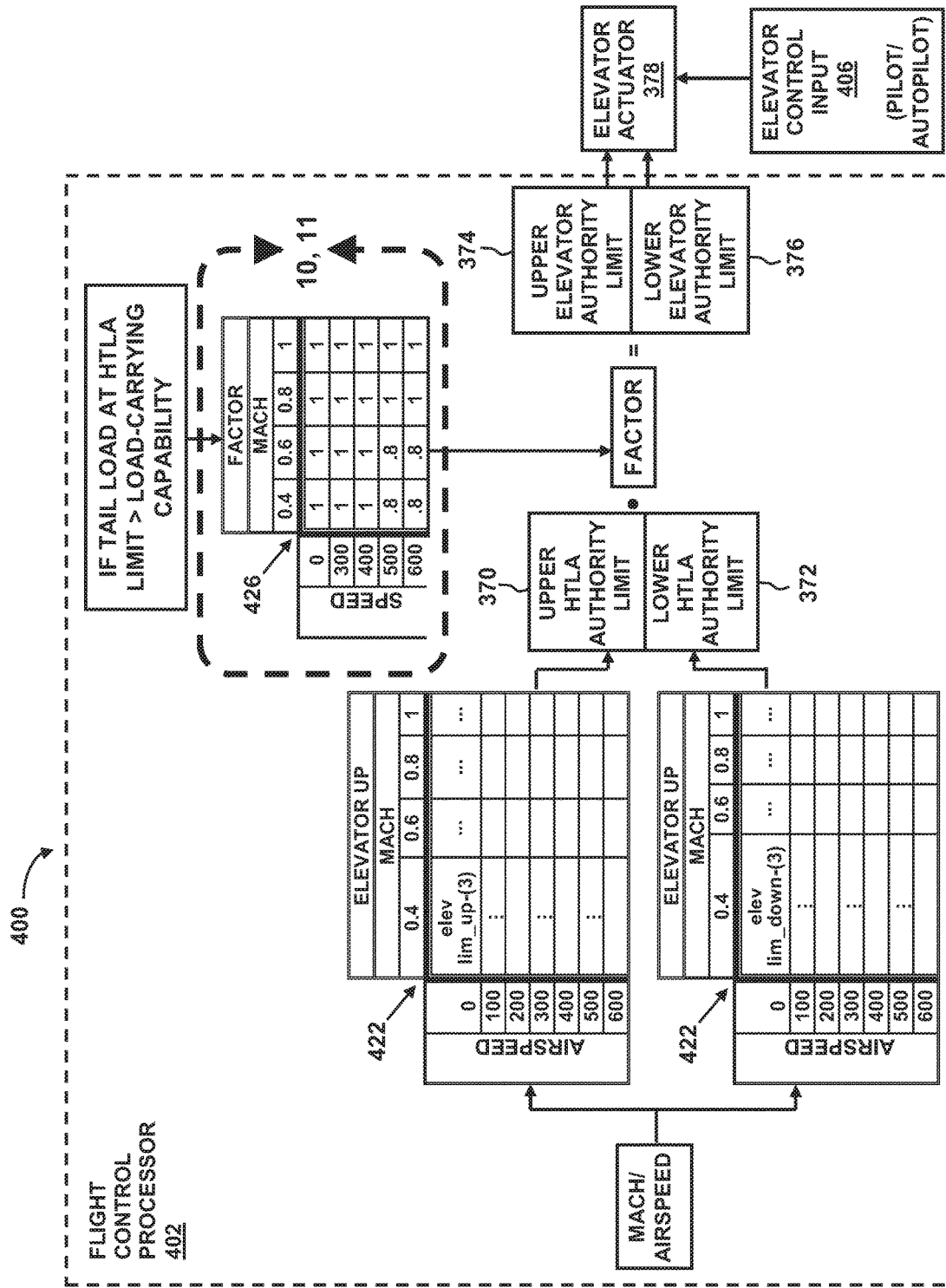
FIG. 9 is a schematic illustration of an example of a system for controlling an elevator wherein the factors for increasing or decreasing the HTLA authority limits are based upon Mach number and/or airspeed.

FIG. 9 shows a system 400 for controlling an elevator 360 wherein the factors for increasing or decreasing the HTLA authority limits 370, 372 listed in the lookup tables 422 are based upon Mach and/or airspeed if a predicted tail load 308 is determined to exceed a load-carrying capability of the horizontal tail 306. In this regard, the flight control processor 402 may calculate the predicted tail load 308 that may be imposed on the horizontal tail 306 with the elevator 360 at a given HTLA authority limit 370, 372. The predicted tail load 308 may be based on one or more of a variety of aircraft parameters including, but not limited to, current aircraft gross weight, current aircraft CG location, current aircraft pitch rate, airspeed, wing angle of attack, control surface deflection (e.g., leading and/or trailing edge devices), speed brake position and level of deployment, landing gear position, and other aircraft parameters. The flight control processor 402 may determine whether the predicted tail load 308 exceeds the load-carrying capability of the horizontal tail 306 for the given set of aircraft parameters. The flight control processor 402 may compute or select a factor from a lookup table 426 for applying to the HTLA authority limits 370, 372 based on the Mach number and/or airspeed of the aircraft 100 if it is determined that the predicted tail load 308 may exceed the load-carrying capability of the horizontal tail 306 and/or fuselage 104.

Figure 10:
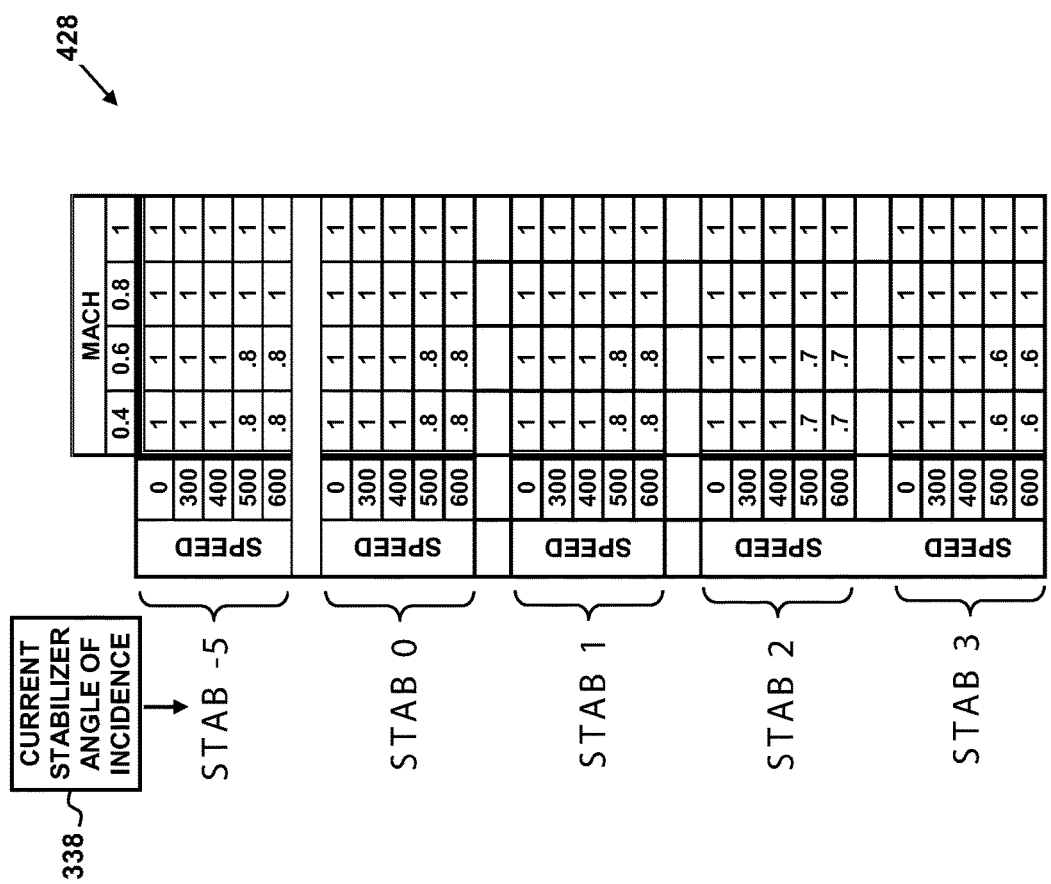
FIG. 10 is a schematic illustration of a set of lookup tables listing factors for different stabilizer angles of incidence based upon Mach number and/or airspeed.

FIG. 10 shows a set of lookup tables 428 listing different factors for different stabilizer settings (angles of incidence 338) based upon Mach number and/or airspeed. The lookup tables 428 in FIG. 10 may be described as a combination of the factor lookup tables 424, 426 shown respectively in FIGS. 8 and 9 and described above. FIG. 10 represents an embodiment of the elevator control system 400 enabling scheduling of the elevator position limit 374, 376 as a function of current stabilizer angle of incidence 338, Mach number, and/or airspeed. The factors may generally increase (e.g., become more restrictive) with an increase in airspeed, although for some flight regimes, the factors may not necessarily increase with increasing Mach number, as shown in the lookup tables 428.

Figure 11:
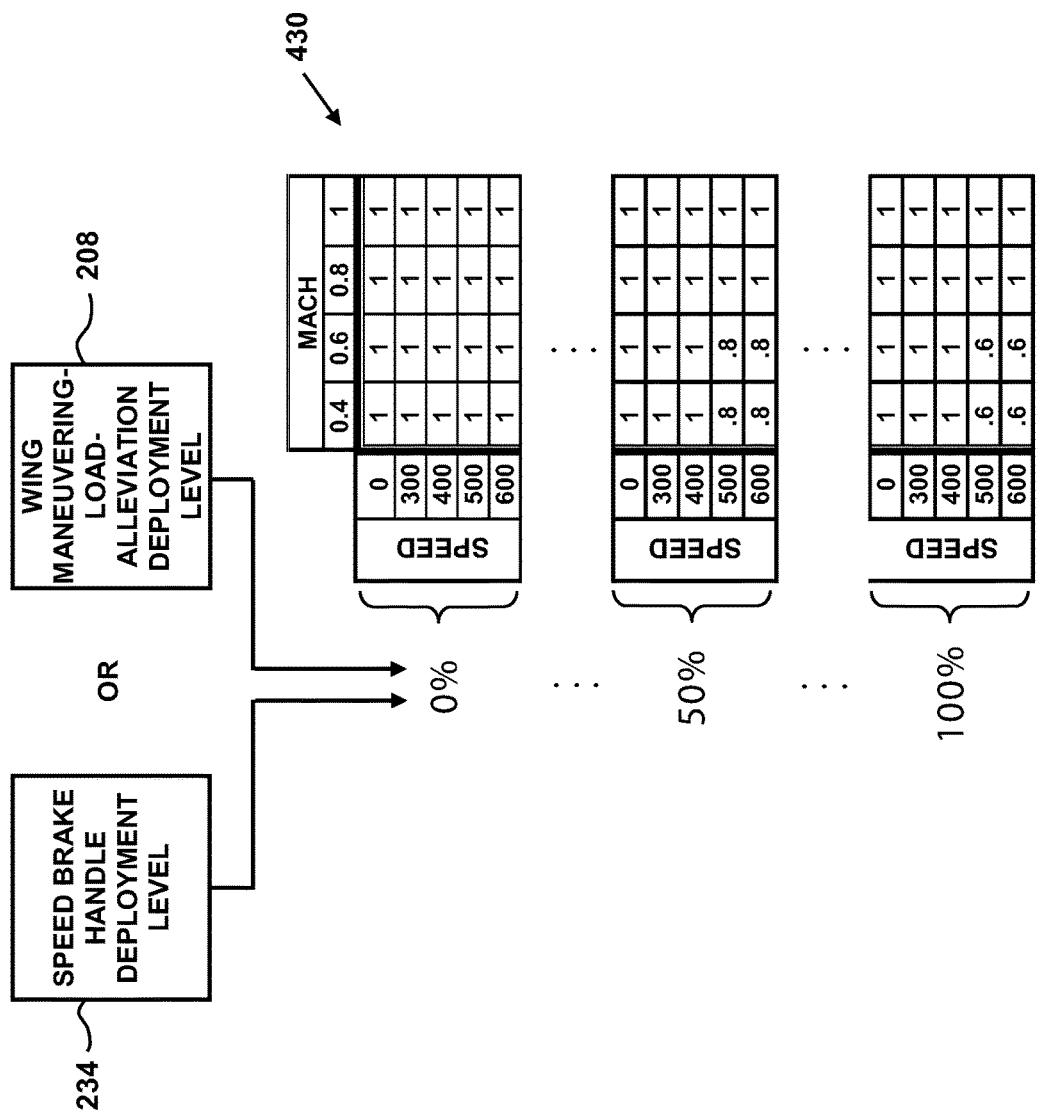
FIG. 11 is a schematic illustration of a set of lookup tables listing factors for different levels of deployment of a speed brake handle and/or different levels of deployment of a wing maneuvering-load-alleviation system.

FIG. 11 shows a set of lookup tables 430 listing different factors for different levels of deployment of a speed brake handle 234 and/or different levels of deployment of a wing maneuvering-load-alleviation system 208. As indicated earlier, the speed brakes 232 may be actuated in response to manipulation of a speed brake handle 234 (FIG. 1) by a pilot. For example, the pilot may move the speed brake handle 234 from a retracted detent (not shown) to a flight detent (not shown) which may represent a 50 percent deployment level of the speed brakes 232 and which may generate a nose-up pitching moment that may reduce or add to the wing pitching moment 206, depending upon the location of the wing aerodynamic center 204 (e.g., center of lift) relative to the aircraft CG 114. If the predicted tail load 308 is determined to exceed the load-carrying capability of the horizontal tail 306, the flight control processor 402 may compute the upper and lower elevator position limits 374, 376 as a product of the reduction factor and the upper and lower HTLA authority limits 370, 372. As shown in the lookup tables 430 of FIG. 11, the reduction factor may be computed by the flight control processor 402 based upon Mach and airspeed. The upper and lower elevator position limits 374, 376 may reduce the tail loads 308 while preserving pitch maneuverability of the aircraft 100.

In some examples, the wings 200 (FIG. 2) may further include a wing maneuvering-load-alleviation system 208 which may be actuated to a desired deployment level during cruise flight to reduce wing bending moment by deflecting one or more of the speed brakes 232, leading edge devices 222, and/or trailing edge devices 224 to vary the wing camber along a spanwise direction 214 (FIG. 2). The flight control processor 402 may be configured to compute or look up factors in a set of lookup tables 430 which may correspond to the level of deployment of the wing maneuvering-load-alleviation system 208 and based upon the Mach and/or airspeed of the aircraft 100. The flight control processor 402 may determine whether the predicted tail load 308 would exceed the load-carrying capability of the horizontal tail 306 and, if so, the flight control processor 402 may compute the upper and lower elevator position limits 374, 376 using the appropriate reduction factor for a given level of deployment of the wing maneuvering-load-alleviation system 208.

Figure 12:
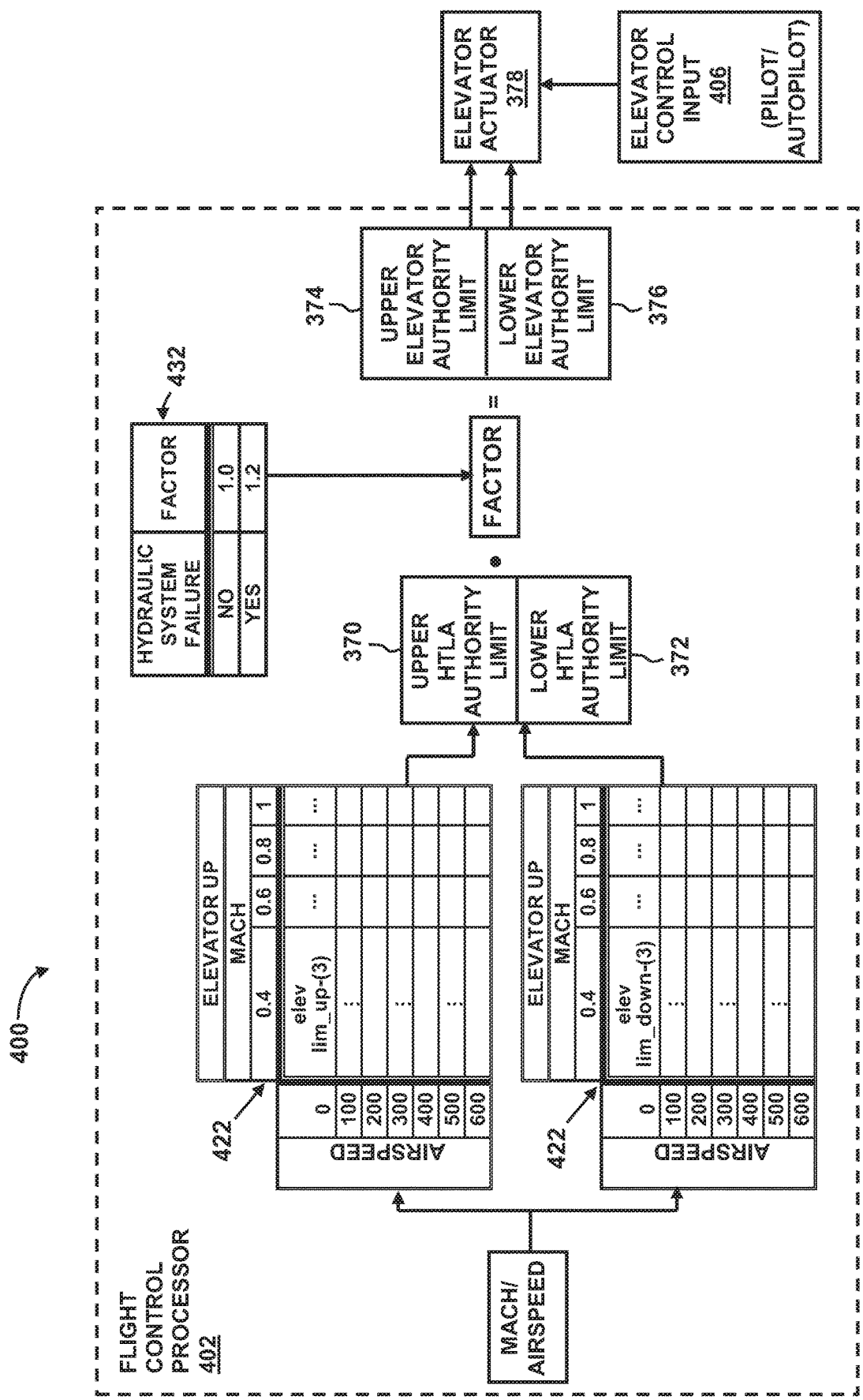
FIG. 12 is a schematic illustration of an example of a system for controlling the elevator wherein the factors for increasing or decreasing the HTLA authority limits are based upon the occurrence of a failure of a hydraulic system of one or more elevator actuators.

FIG. 12 shows a further embodiment of an elevator control system 400 using factors for increasing the HTLA authority limits 370, 372 listed in the lookup tables 422. The factors may be based upon a failure of one or more hydraulic system 380 (FIG. 1) of one or more of the elevator actuators 378. Although the lookup table 432 shows a single factor to be used upon an indication of a hydraulic system failure, different factors may be used for different Mach numbers and airspeeds of the aircraft. Upon the detection of a hydraulic system failure of one or more of the elevator actuators 378, the flight control processor 402 may compute a factor or select a factor from a lookup table 432 to apply to the HTLA authority limit 370, 372. The factors may be less restrictive (e.g., allow more deflection capability) to provide sufficient pitch control to the aircraft 100 during a failure of one or more hydraulic systems. In such a scenario, the deflection capability of one or both of the elevators 360 may be increased at the risk of temporarily exceeding the design-allowable load-carrying capability of the horizontal tail 306 and/or fuselage 104 so that pitch control of the aircraft may be maintained.

Figure 13:
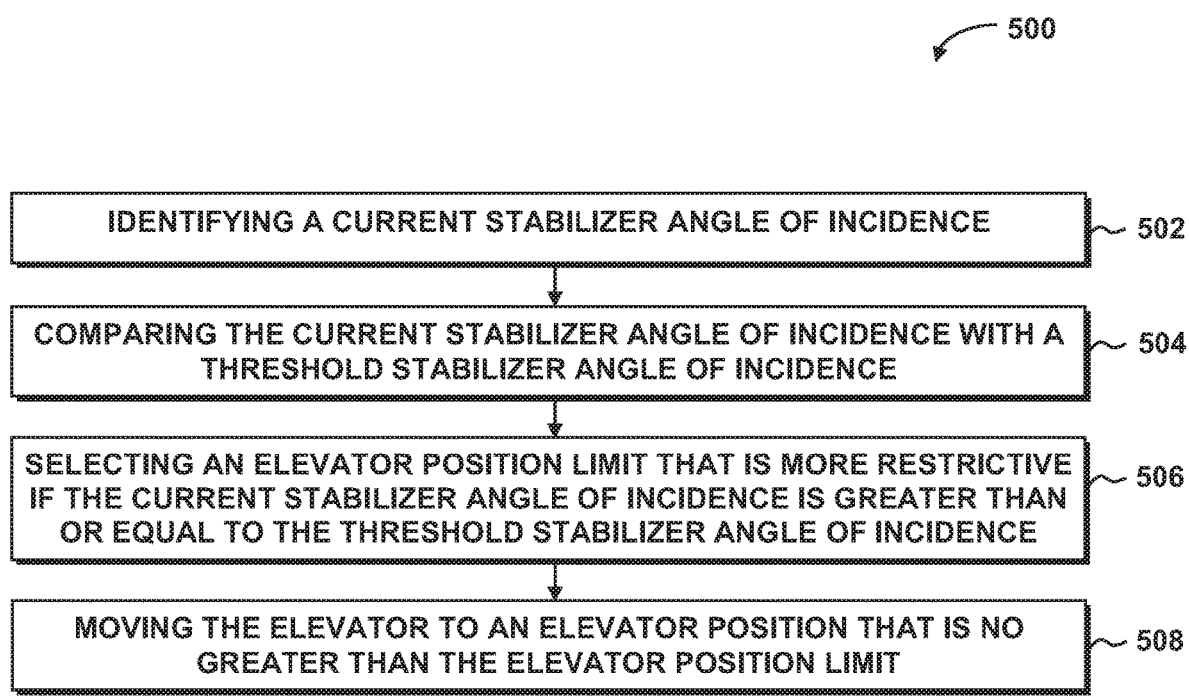
FIG. 13 is a flowchart illustrating one or more operations that may be included in a method of positioning an elevator based upon a current stabilizer angle of incidence.

FIG. 13 is a flowchart illustrating one or more operations that may be included in a method 500 of positioning an elevator 360 based upon a current stabilizer angle of incidence 338. With reference to FIG. 6, Step 502 of the method may include identifying the current stabilizer angle of incidence 338. As indicated above, the flight control processor 402 may receive a signal representative of the current stabilizer angle of incidence 338. The current stabilizer angle of incidence 338 may be representative of whether the speed brakes 232 are retracted or deployed, and may be determined based upon one or more of a variety of aircraft parameters 408 including, but not limited to, airspeed, Mach number, dynamic pressure, current aircraft gross weight, current aircraft CG location, current aircraft pitch rate, speed brake position, activation status of a wing MLA system, and other aircraft parameters.

Step 504 of the method may include comparing the current stabilizer angle of incidence 338 with a threshold stabilizer angle of incidence 342 to determine whether the current stabilizer angle of incidence 338 is above or below the threshold stabilizer angle of incidence 342. As indicated above, the threshold stabilizer angle of incidence 342 may correspond to a value below which the speed brakes 232 of the aircraft 100 may be retracted.

For example, a current stabilizer angle of incidence 338 which is less than positive 1 degree may represent that the speed brakes 232 are retracted, and a current stabilizer angle of incidence 338 of positive 1 degree or higher may represent that the speed brakes 232 are deployed. However, the threshold stabilizer angle of incidence 342 may be different than positive 1 degree.

Step 506 of the method 500 may include selecting an elevator position limit 374, 376 based on the current stabilizer angle of incidence 338. In some examples, the method may include generating a plurality of lookup tables 418 including a first pair of lookup tables containing values for an upper elevator position limit 374 and a second pair of lookup tables containing values for a lower elevator position limit 376. As indicated above, the elevator position limits may be computed as a function of Mach number, airspeed, dynamic pressure, and/or altitude, and may be based on a threshold stabilizer angle of incidence 342. The elevator position limits may be selected from the lookup tables 418. In some examples, a flight control processor 402 (FIG. 1) may compute the elevator position limits 374, 376 and store the elevator position limits 374, 376 in lookup tables 418 of a storage device 403 (FIG. 1). In other examples, elevator position limits 374, 376 may be computed in advance (e.g., prior to a flight) and may be preprogrammed into a flight control computer 401 and stored in the storage device 403 for access by the flight control processor 402 during flight.

In Step 506 the method may include selecting an elevator position limit 374, 376 that is more restrictive if the current stabilizer angle of incidence 338 is equivalent to or above a threshold stabilizer angle of incidence 342, and selecting an elevator position limit 374, 376 that is less restrictive if the current stabilizer angle of incidence 338 is below the threshold stabilizer angle of incidence 342. For example, if the current stabilizer angle of incidence 338 is greater than or equal to the threshold stabilizer angle of incidence 342, a value for an upper elevator position limit 374 may be selected from a first table of the first pair of lookup tables, and if the current stabilizer angle of incidence 338 is below the threshold stabilizer angle of incidence 342, a value for the upper elevator position limit 374 may be selected from a second table of the first pair of lookup tables.

In some examples, an upper elevator position limit 374 may be associated with a given airspeed and Mach number of an aircraft 100. A lower elevator position limit 376 may be selected from a second pair of lookup tables. The lower elevator position limit 376 may be associated with the same airspeed and Mach number as the upper elevator position limit 374. However, the lower elevator position limit 376 may have a different magnitude than the magnitude of the upper elevator position limit 374. For example, an aircraft 100 moving at Mach 0.6 with an airspeed of 600 miles per hour may have an upper elevator position limit 374 of 8 degrees and a lower elevation position limit of 10 degrees for the same Mach and airspeed.

In some examples, the selection of an elevator position limit 374, 376 may include selecting a lower elevator position limit 376 from a second pair of lookup tables. The lower elevator position limit 376 may be associated with a given airspeed and Mach number. The magnitude of the lower elevator position limit 376 may be greater than the magnitude of the upper elevator position limit 374 if the current stabilizer angle of incidence 338 is negative, and the magnitude of the lower elevator position may be less than the magnitude of the upper elevator position limit 374 if the current stabilizer angle of incidence 338 is positive. For example, for an aircraft 100 moving at Mach 0.6 and an airspeed of 600 miles per hour, if the current stabilizer angle of incidence 338 is negative, the lower elevator position limit 376 may be −10 degrees and the upper elevator position limit 374 may be +8 degrees. However, for the same Mach and airspeed, if the current stabilizer angle of incidence 338 is positive, the lower elevator position limit 376 may be −8 degrees and the upper elevator position limit 374 may be +10 degrees.

In some examples, the method may include selecting a value for the lower elevator position limit 376 from one table of the second pair of lookup tables if the current stabilizer angle of incidence 338 is greater than or equal to the threshold stabilizer angle, and selecting a value for the lower elevator position limit 376 from the other table of the second pair of lookup tables if the current stabilizer angle of incidence 338 is below the threshold stabilizer angle of incidence 342. With reference to FIG. 7, the method may also include selecting a value for an elevator position limit 374, 376 based on the status of the aircraft hydraulic system. For example, in the event of a hydraulic system failure, the method may include selecting an elevator position limit 374, 376 that is less restrictive than the elevator position limit 374, 376 that may be selected in the absence of the hydraulic system failure. As indicated above, in the event of the hydraulic system failure, the elevator position limits (e.g., the deflection capability) of one or both of the elevators 360 may be increased as a means to maintain pitch maneuverability of the aircraft 100.

Step 508 of the method 500 may include moving the elevator 360 to a commanded elevator position that is no greater than the elevator position limit 374, 376. As shown in the embodiment of FIG. 6, the flight control processor 402 may compute the upper elevator position limit 374 and the lower elevator position limit 376, and transmit the elevator position limits 374, 376 to the elevator actuator 378. The pilot or autopilot may command the elevator actuators 378 to move the elevators 360 to a commanded elevator position which may be no greater than the elevator position limits 374, 376. In some embodiments, the method may include determining whether the speed brakes 232 are deployed and, if so, positioning the stabilizer 330 at a stabilizer angle of incidence 338 that results in a smaller download 312 or a larger upload 310 than the respective download 312 or upload 310 generated by the stabilizer 330 at a stabilizer angle of incidence 338 for when the speed brakes 232 are retracted. In this manner, the stabilizer 330 may counteract a nose-up pitching moment that may be generated during deployment of the speed brakes 232.

Figure 14:
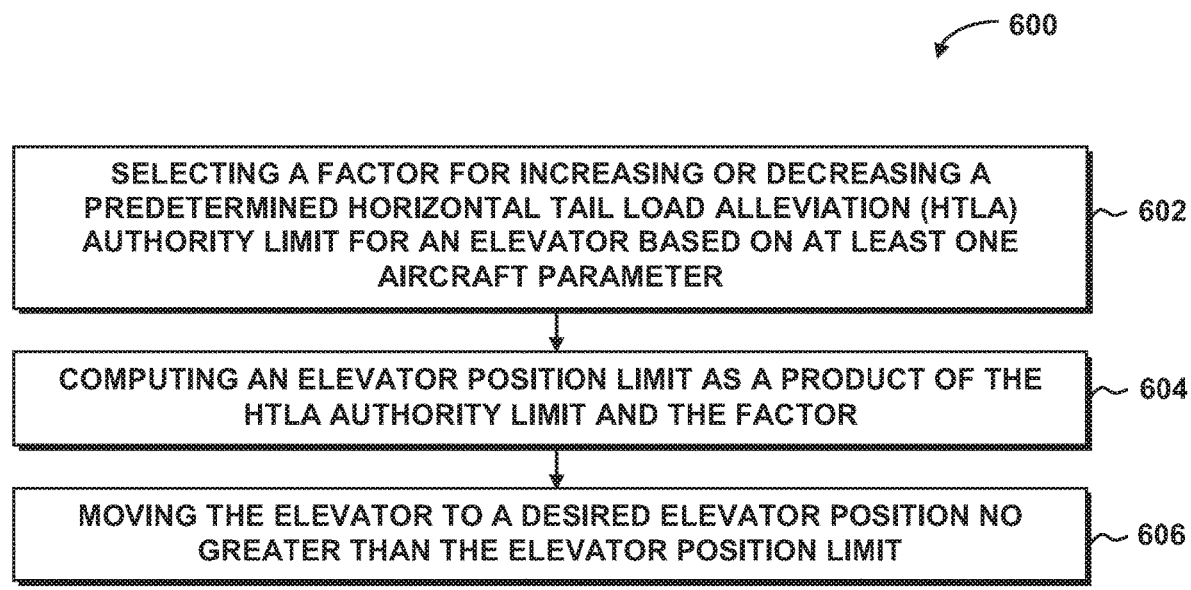
FIG. 14 is a flowchart illustrating one or more operations that may be included in a method of positioning an elevator based upon a predetermined set of HTLA authority limits.

FIG. 14 is a flowchart illustrating one or more operations that may be included in a method 600 of positioning an elevator 360 based upon a predetermined set of HTLA authority limits 370, 372. Step 602 of the method 600 may include selecting a factor for increasing or decreasing a predetermined HTLA authority limit 370, 372 based on one or more aircraft parameters 408. As indicated above, the HTLA authority limits 370, 372 may decrease with an increase in Mach number and/or airspeed or other parameters (e.g., altitude) to compensate for any increase in dynamic pressure with increasing Mach and/or airspeed. In some embodiments, the method may include selecting a reduction factor based on the current stabilizer angle of incidence 338 as shown in FIG. 8 and described above. As shown in lookup table, the reduction factor may decrease with an increase in the current stabilizer angle of incidence 338.

In some embodiments, the method may include calculating a predicted tail load 308 on the horizontal tail 306 with the elevator 360 at a given HTLA authority limit 370, 372. The predicted tail load 308 may be determined based on one or more aircraft parameters including, but not limited to, the current aircraft gross weight, the current aircraft CG 114 location, the current aircraft pitch rate, and/or other aircraft parameters, as described above. The method may further include determining whether the predicted tail load 308 exceeds a load-carrying capability of the horizontal tail 306 and/or fuselage 104. If the predicted tail load 308 exceeds the load-carrying capability of the horizontal tail 306 and/or fuselage 104, the method may include selecting a reduction factor for the HTLA authority limit 370, 372 based on the Mach and airspeed of the aircraft 100.

In some examples, the method may include selecting a reduction factor based on Mach, airspeed, and current stabilizer angle of incidence 338 as illustrated in FIG. 10. A reduction factor may be implemented by the flight control processor 402 to calculate the upper and lower elevator position limits 374, 376 based upon the upper and lower HTLA authority limits 370, 372 as shown in FIG. 9 and described above. Alternatively, the step of selecting a factor for the HTLA authority limit 370, 372 may include selecting a reduction factor if speed brakes 232 are deployed and/or if the wing maneuvering-load-alleviation system 208 is activated, as illustrated in FIG. 11 and described above. In other embodiments, the step of selecting a factor for the HTLA authority limit 370, 372 may include selecting a factor to increase the HTLA authority limit 370, 372 upon detection of a hydraulic system 380 (FIG. 1) failure of an elevator actuator 378. For example, the flight control processor 402 may receive an indication of a failure of one or more of the hydraulic systems for the elevator actuators 378. Upon receiving such indication of failure of a hydraulic system, the flight control processor 402 may compute an increased value for the upper elevator position limit 374 and/or the lower elevator position limit 376 in order to maintain pitch maneuverability of the aircraft 100 during failure of the hydraulic system.

Step 604 of the method 600 may include computing an elevator position limit 374, 376 as a product of the HTLA authority limit 370, 372 and the factor, as shown in FIGS. 8, 9, and 12. The flight control processor 402 may compute an upper elevator position limit 374 and a lower elevator position limit 376 based upon upper and lower HTLA authority limits 370, 372. As indicated above, the HTLA authority limits 370, 372 may be predetermined based upon Mach number and/or airspeed of the aircraft 100.

Step 606 of the method 600 may include moving the elevator 360 to a commanded elevator position that is no greater than the upper and lower elevator position limit 374, 376 computed by the flight control processor 402. As indicated above, the pilot or autopilot may command the elevator actuators 378 to move the elevators 360 to a commanded elevator position. The elevator actuators 378 may receive the command from an elevator control input 406, and may pivotably move the elevator 360 to the commanded elevator position, and may restrict movement of the elevator 360 to a position that is no greater than the upper and lower elevator position limits 374, 376.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of controlling an elevator of a horizontal tail of an aircraft, comprising:
  selecting a factor for increasing or decreasing a predetermined horizontal tail load alleviation (HTLA) authority limit for an elevator based on at least one aircraft parameter, the HTLA authority limit being a function of Mach number and/or airspeed, and decreasing with an increase in Mach number and/or airspeed, the factor being calculated independent of the HTLA authority limit;

computing an elevator position limit as a product of the HTLA authority limit and the factor; and moving the elevator to a commanded elevator position that is no greater than the elevator position limit.

2. The method of claim 1, wherein the aircraft parameter is a current stabilizer angle of incidence of a stabilizer of the horizontal tail, the step of selecting a factor for the HTLA authority limit comprises:

selecting a reduction factor based on the current stabilizer angle of incidence.

3. The method of claim 2, wherein the step of selecting the reduction factor includes:

decreasing the reduction factor with an increase in the current stabilizer angle of incidence.

4. The method of claim 1, wherein the step of selecting a factor for the HTLA authority limit comprises:

calculating a predicted tail load on the horizontal tail with the elevator at a given HTLA authority limit;

determining whether the predicted tail load exceeds a load-carrying capability of the horizontal tail; and selecting a reduction factor for the HTLA authority limit based on the Mach number and/or airspeed of the aircraft if the predicted tail load exceeds the load-carrying capability.

5. The method of claim 4, wherein the step of selecting the reduction factor for the HTLA authority limit comprises:

selecting a reduction factor based on Mach, airspeed, and current stabilizer angle of incidence.

6. The method of claim 1, wherein the step of selecting a factor for the HTLA authority limit comprises:

selecting a reduction factor if speed brakes are deployed and/or if a wing maneuvering-load-alleviation system is activated.

7. The method of claim 1, wherein the step of selecting a factor for the HTLA authority limit comprises:

selecting a factor to increase the HTLA authority limit upon detection of a hydraulic system failure of an elevator actuator.

8. The method of claim 1, further comprising:

moving the elevator to an elevator position that is no greater than the elevator position limit.

9. The method of claim 8, wherein moving the elevator comprises:

moving the elevator to the elevator position in response to an elevator command initiated by a pilot or by an autopilot.

10. A system of controlling an elevator of a horizontal tail of an aircraft, comprising:

a flight control processor configured to select a factor for increasing or decreasing a predetermined set of horizontal tail load alleviation (HTLA) authority limits for different elevator positions based on at least one aircraft parameter, the predetermined set of HTLA authority limits being a function of Mach number and/or airspeed, and decreasing with an increase in Mach and/or airspeed, the factor being calculated independent of the HTLA authority limit;

the flight control processor is configured to compute an elevator position limit as a product of the HTLA authority limit and the factor; and an elevator actuator configured to move the elevator to a desired elevator position that is no greater than the elevator position limit.

11. The system of claim 10, wherein:

the aircraft parameter is a current stabilizer angle of incidence of a stabilizer of the horizontal tail; and the flight control processor is configured to select a reduction factor based on the current stabilizer angle of incidence.

12. The system of claim 11, wherein:

the flight control processor decreasing the reduction factor with an increase in the current stabilizer angle of incidence.

13. The system of claim 10, wherein:

the flight control processor is configured to calculate a predicted tail load on the horizontal tail with the elevator at a given HTLA authority limit, and determine whether the predicted tail load exceeds a load-carrying capability of the horizontal tail; and the flight control processor is configured to select a reduction factor for the HTLA authority limit based on the Mach and/or airspeed of the aircraft if the predicted tail load exceeds the load-carrying capability.

14. The system of claim 10, wherein:

the flight control processor is configured to select a reduction factor based on Mach, airspeed, and current stabilizer angle of incidence.

15. The system of claim 10, wherein:

the flight control processor is configured to select a reduction factor if speed brakes are deployed and/or if a wing maneuvering-load-alleviation system is activated.

16. The system of claim 10, wherein:

the flight control processor is configured to select a factor to increase the HTLA authority limit upon detection of a hydraulic system failure of the elevator actuator.

17. A system for controlling an elevator of an aircraft, comprising:

a flight control processor configured to receive a stabilizer signal representative of a current stabilizer angle of incidence of a stabilizer having an elevator pivotably coupled to the stabilizer and select an elevator position limit based on the stabilizer signal, wherein the selected elevator position limit is more restrictive if the current stabilizer angle of incidence is equal to or above a threshold stabilizer angle of incidence, and less restrictive if the current stabilizer angle of incidence is below the threshold stabilizer angle of incidence, the flight control processor configured to reduce the elevator position limit upon at least one of:

deployment of speed brakes;

activation of a wing maneuvering-load-alleviation system for varying wing camber along a spanwise direction; and an elevator actuator configured to move the elevator to an elevator position that is no greater than the elevator position limit.

18. The system of claim 17, wherein the threshold stabilizer angle of incidence corresponds to a value below which speed brakes of the aircraft are retracted.

19. The system of claim 17, wherein the flight control processor is further configured to select, for a given Mach number and airspeed, an upper elevator position limit and a lower elevator position limit having a magnitude different from a magnitude of the upper elevator position limit.

20. The system of claim 17, wherein for a given Mach number, airspeed, and current stabilizer angle of incidence, the flight control processor is further configured to select another elevator position limit which is less restrictive than the selected elevator position limit responsive to an indication of a hydraulic system failure.

21. The method of claim 4, wherein the predicted tail load is based on at least one of the following:
   aircraft gross weight;
   aircraft CG location; and
   aircraft pitch rate.

22. The method of claim 1, wherein the HTLA authority limit is computed in real time by a flight control processor.

23. The method of claim 1, wherein the HTLA authority limit is preprogrammed into a flight control processor.

24. The method of claim 1, wherein the HTLA authority limit is stored in a lookup table.

25. The method of claim 1, wherein the factor is stored in a lookup table.

26. The method of claim 1, wherein the step of selecting the factor comprises:
   selecting the factor from among a single set of factors for determining both an upper elevator position limit and a lower elevator position limit.

27. The method of claim 1, wherein the step of selecting the factor comprises:
   selecting the factor from among one set of factors for determining an upper elevator position limit, and a different set of factors for determining a lower elevator position limit.

28. The method of claim 1, wherein the HTLA authority limit is an electronic limit that restricts deflection capability of the elevator.

29. The method of claim 28, wherein a maximum position of the elevator is determined by a mechanical stop.

30. The method of claim 1, wherein the factor is based on a deployment setting of one or more wing leading edge devices, one or more wing trailing edge devices, or a combination thereof.

31. The method of claim 6, wherein the speed brakes are actuated by manipulation of a speed brake handle.

* * * * *